(12) United States Patent
Frederick et al.

(10) Patent No.: US 12,287,638 B2
(45) Date of Patent: Apr. 29, 2025

(54) LOADING DOCK AREA SAFETY SYSTEM UTILIZING PULSED MAGNETIC FIELDS

(71) Applicant: Frederick Mobile Instrumentation, LLC, Huntsville, AL (US)

(72) Inventors: Larry D. Frederick, Huntsville, AL (US); Andrew Nichols, Huntsville, AL (US)

(73) Assignee: FREDERICK MOBILE INSTRUMENTATION, LLC, Huntsville, AL (US)

( * ) Notice: Subject to any disclaimer, the term of this patent is extended or adjusted under 35 U.S.C. 154(b) by 213 days.

(21) Appl. No.: 17/906,754

(22) PCT Filed: Mar. 19, 2021

(86) PCT No.: PCT/US2021/023313
§ 371 (c)(1),
(2) Date: Sep. 20, 2022

(87) PCT Pub. No.: WO2021/194904
PCT Pub. Date: Sep. 30, 2021

(65) Prior Publication Data
US 2023/0148011 A1 May 11, 2023

Related U.S. Application Data

(60) Provisional application No. 62/993,035, filed on Mar. 22, 2020.

(51) Int. Cl.
*G05D 1/00* (2024.01)
*B66F 9/06* (2006.01)

(52) U.S. Cl.
CPC ........... *G05D 1/0259* (2013.01); *B66F 9/063* (2013.01); *G05D 1/0289* (2013.01); *G05D 1/0291* (2013.01)

(58) Field of Classification Search
None
See application file for complete search history.

(56) References Cited

U.S. PATENT DOCUMENTS

| | | | |
|---|---|---|---|
| 7,420,471 | B2 | 9/2008 | Frederick et al. |
| 8,169,335 | B2 | 5/2012 | Frederick et al. |
| 8,232,888 | B2 | 7/2012 | Frederick et al. |
| 8,446,277 | B2 | 5/2013 | Frederick |
| 8,552,882 | B2 | 10/2013 | Frederick et al. |
| 8,710,979 | B2 | 4/2014 | Frederick |
| 8,810,390 | B2 | 8/2014 | Frederick |
| 8,847,780 | B2 | 9/2014 | Frederick et al. |
| 9,081,046 | B2 | 7/2015 | Frederick |

(Continued)

OTHER PUBLICATIONS

PCT International Search Report for PCT Application No. PCT/US2021/023313 mailed Jul. 23, 2021 (2 pages).

(Continued)

*Primary Examiner* — Brian P Sweeney
*Assistant Examiner* — Jonathan E Reinert
(74) *Attorney, Agent, or Firm* — Merchant & Gould P.C.

(57) ABSTRACT

A dock area control system includes a vehicle proximity detection system (PDSC). The PDSC includes a vehicle low frequency magnetic field generator (MFG) that generates a vehicle pulsed magnetic field that is sensed by a dock area controller electronics module (DEM).

34 Claims, 12 Drawing Sheets

(56) References Cited

U.S. PATENT DOCUMENTS

| | | |
|---|---|---|
| 9,280,885 B2 | 3/2016 | Frederick |
| 9,788,151 B2 | 10/2017 | Duan et al. |
| 9,822,927 B2 | 11/2017 | Frederick |
| 10,200,886 B2 | 2/2019 | Duan et al. |
| 10,444,321 B2 | 10/2019 | Pu et al. |
| 11,259,143 B2 | 2/2022 | Duan et al. |
| 11,259,144 B2 | 2/2022 | Duan et al. |
| 11,470,448 B2 | 10/2022 | Ye et al. |
| 11,519,999 B2 | 12/2022 | Rybalko et al. |
| 11,619,703 B2 | 4/2023 | Duan et al. |
| 11,624,801 B2 | 4/2023 | Ye et al. |
| 11,638,187 B2 | 4/2023 | Ye et al. |
| 11,682,305 B2 | 6/2023 | Ye et al. |
| 11,762,056 B2 | 9/2023 | Ye et al. |
| 11,812,328 B2 | 11/2023 | Ye et al. |
| 2008/0042865 A1 | 2/2008 | Shephard et al. |
| 2014/0125488 A1 | 5/2014 | Frederick et al. |
| 2015/0156746 A1 | 6/2015 | Horne et al. |
| 2015/0311649 A1 | 10/2015 | Horne et al. |
| 2015/0375947 A1 | 12/2015 | Hochstein et al. |
| 2018/0038938 A1* | 2/2018 | Fechine .................. B60Q 9/00 |
| 2018/0128932 A1 | 5/2018 | Frederick et al. |
| 2019/0025839 A1* | 1/2019 | Manjunath ........... G05D 1/0259 |
| 2020/0024090 A1 | 1/2020 | Mushynski et al. |
| 2022/0272488 A1 | 8/2022 | Pekhteryev et al. |
| 2022/0377752 A1 | 11/2022 | Zhbankov et al. |
| 2022/0390586 A1 | 12/2022 | Ye |
| 2023/0067130 A1 | 3/2023 | Duan et al. |
| 2023/0217211 A1 | 7/2023 | Duan et al. |

OTHER PUBLICATIONS

PCT Written Opinion for PCT Application No. PCT/US2021/023313 mailed Jul. 23, 2021 (6 pages).

\* cited by examiner

LOADING DOCK AREA SAFETY SYSTEM UTILIZING PULSED MAGNETIC FIELDS

This application is a National Stage Application of PCT/US2021/023313, filed on Mar. 19, 2021, which claims the benefit of and priority to U.S. Provisional patent application Ser. No. 62/993,035, filed Mar. 22, 2020, the entire disclosures of which are incorporated by reference in their entirety. To the extent appropriate, a claim of priority is made to each of the above-disclosed applications.

BACKGROUND

Proximity Detection Systems and Collision Avoidance systems (PDSC) are being used worldwide for minimizing collisions between vehicles, to prevent hitting and/or crushing personnel, and to prevent costly hardware and facility damage. The earliest successful solutions were developed for use in underground mining applications, using pulsed low frequency magnetic fields. Pulsed low frequency magnetic fields have been successfully modified and augmented with new devices to provide proximity detection and collision avoidance for numerous industries. Solutions have been developed for operation of vehicles in open areas, open storage in warehouses, and a variety of manufacturing and materials handling applications, especially for using fork lifts. Very narrow aisles (VNAs) in warehouses that utilize very tall metal rack systems posed extra challenges which were solved by adding the use of vector components of magnetic fields and/or compasses. See the Frederick patents, discussed below. This technology has been proven effective for providing Proximity Detection Systems (PDS) and Collision Avoidance Systems (CAS) (PDS/CAS or PDSC) in many industrial environments.

The high reliability and precision of these pulsed low frequency magnetic field systems has led to a variety of system configurations and devices that protect personnel (pedestrians, vehicle operators, and other people, whether performing work or not, are generically referred to as "workers"), prevent collisions between vehicles and/or machines, and prevent collisions with facility items. Examples of these devices are disclosed in U.S. Pat. No. 7,420,471 (the '471 patent), U.S. Pat. No. 8,169,335 (the '335 patent), U.S. Pat. No. 8,552,882 (the '882 patent) U.S. Pat. No. 8,232,888 (the '888 patent), U.S. Pat. No. 8,446,277 (the '277 patent), U.S. Pat. No. 8,847,780 (the '780 patent), U.S. Pat. No. 8,710,979 (the '979 patent), U.S. Pat. No. 8,810,390 (the '390 patent), U.S. Pat. No. 9,081,046 (the '046 patent), U.S. Pat. No. 9,280,885 (the '885 patent), U.S. Pat. No. 9,822,927 (the '927 patent), and U.S. patent publication 2018/0128932 (the '932 publication), which patents and publications are herein referred to collectively as the "Frederick patents," the disclosures of which are incorporated herein by reference in their entireties. Reference earlier Frederick patents for details on how the PDSCs and PADs function. The Frederick patents disclose the details about the construction and application of a successful PDSC system that has the necessary capabilities and characteristics for the current disclosure to be most useful. The following descriptions do not repeat the details of a PDSC already disclosed in the Frederick patents, for example, the general PING and ECHO response architecture, and the Warning zone and Danger zone alarms, protocols and configurations, but describe the current disclosure with the assumption that the reader will be acquainted with those PDSC ideas and inventions.

In addition to using proximity detection systems, facilities are frequently designed to try to provide added physical separation between pedestrians and vehicles, as much as possible, and to slower vehicle speeds. Enhanced separation of personnel from moving vehicles by use of mechanical barriers, by better training, and by use of magnetic field devices, such as mechanized area controllers, has reduced the number of some types of accidents. However, in some instances, these approaches have resulted in reduced production. And, there are numerous situations that necessitate both vehicles, such as fork trucks, and pedestrians to work in the same area. The fact that most fork trucks are driven by an operator illustrates that operators and trucks must sometimes be in the same area. In some instances, there is a mix of automatically-guided vehicles (AGVs), human-operated fork trucks, and pedestrians. One such example would be a large distribution center which includes roadways and docking portals.

Modern distribution centers create additional challenges for protecting pedestrians, collisions between fork trucks, and collisions with automatically guided vehicles. A typical distribution center has dozens or even hundreds of docking portals at which trailers are loaded or unloaded with products and materials. In the majority of the larger installations, loading or unloading of trailers is accomplished by use of low-profile fork trucks that drive from the dock into the parked trailers. Products are transported from storage areas, usually along roadways within the distribution center, until they reach the trailer that is to be loaded, such as trailers 115, 116, 117 and 118, as depicted in FIG. 1. Sometimes, products are removed from a trailer 115, 116, 117, 118 and transported to storage. In some instances, products are transported directly from one trailer 115, 116, 117, 118 to another trailer or to a conveyor. FIG. 1 illustrates the typical relationship between a roadway 50 and the portals 111, 112, 113, 114 through which trailers are being serviced by fork trucks at a loading dock 100.

Although there are many configurations of distribution centers that are handling a wide variety of products and materials, a typical operation can be viewed as being in phases. Products arrive, in a first phase, on trailers or train cars and are removed by low-profile fork trucks and are taken to a temporary open storage. From there other fork trucks, such as reach trucks, transport the items or pallets of items and place them in large metal rack systems. Some products are not stored in metal racks but are stacked in open areas. Other fork trucks such as order picker trucks elevate workers as required to retrieve specific items, which are then moved to areas where they are packaged for delivery. From there they are organized for loading onto trailers or short-haul trucks. Finally, in a last phase, low-profile fork trucks carry the deliverable products, often on pallets, to staging areas or for loading into trailers. The first and last phases require low-profile trucks that enter portal areas and enter into the trailers or trucks. In many cases small fork lifts of the type that are operated by an operator who is in the standing posture, are preferred. A wide range of situations occur at loading docks that are dangerous and/or result in costly accidents. This disclosure introduces new devices and novel methods of advancing the capabilities of PDSC to save lives, reduce injuries, and to reduce costly accidents. Some materials handling tasks are now being performed by robotic vehicles, which can add to the complexity of the operations and can increase the chance of a costly collision. The current disclosure is applicable to robotic vehicles but typically, the PDSCs must be designed into the robotic vehicle by the original equipment manufacturer (OEM).

The number of pedestrians on loading docks varies with the design and function of the facility. Usually, there are policies that minimize the number of pedestrians in the busy area where fork trucks are arriving and departing from the portal areas. However, there are some specific jobs that require pedestrians to enter the portal areas near the trailers and/or to enter the trailers. Workers on foot may have to remove trash that falls from products or carriers, check markings and labels, provide inspections when there are problems or unexpected changes, coordinate movement of trailers between portals, lock the trailer onto the dock, inspect damage to trailers or products due to contact by truck forks, repair or service equipment, maintain records, etc. Truck operators must sometimes temporarily leave their truck for a few moments, on foot. If significant numbers of pedestrians are in a dock area, there may be a significant number of opportunities for being hit or crushed. If pedestrians are only rarely working in the dock area, fewer chances exist for accidents. Yet, when pedestrians are not frequently present, truck operators tend to be less prepared to quickly recognize danger to pedestrians or to respond rapidly.

It is sometimes necessary for a worker to be in a location where fork trucks may travel. PDSC systems can warn pedestrians and truck operators when they are dangerously close. Some systems like those disclosed in Frederick patents help to prevent both pedestrian and vehicles from being in the same area at the same time. Loading docks present situations that need smart systems, with much capability, but that are not costly to manufacture and install. The current disclosure is a Docking Area Controller (DAC) that includes a DAC Electronics Module (DEM) that satisfies these needs and others as well. As more robotic vehicles are added to distribution centers, new challenges result, including making sure that man operated trucks do not run over costly robotic vehicles and making sure that the robotic vehicles do not run over pedestrians. An added reason for growing complexity is that pedestrians may be required, from time to time, to resolve or correct situations that robotic vehicles have caused, which will also require pedestrians to be in the work area.

Thousands of accident reports each year reveal the many ways that a pedestrian can be hit or crushed by a fork truck or by the products that fork trucks are transporting. A simple, obvious danger is illustrated in FIG. 1. A pedestrian 101 is hidden from view by product 102. The pedestrian 101 does not see the oncoming fork truck 103 and the operator of truck 103 does not see the pedestrian 101. There are video-documented cases where a pedestrian 101 crosses in front of a fork truck 103 and the driver cannot see the pedestrian and runs them over. In such cases, the pedestrian 101 steps into the path of fork truck 103 and there is not enough time for the operator of the fork truck 103 to respond. Automatically Guided Vehicles are sometimes a concern because they may make very little noise and also because they may not be fully prepared to avoid a fork truck.

Fortunately, some types of accidents have been almost eliminated in facilities where PDSC systems have been implemented, particularly those that use pulsed low frequency magnetic fields. Pulsed low frequency magnetic fields pass through objects and also are shaped so that they pass around objects. Pulsed low frequency magnetic fields are also stable and precise. By using this kind of technology, a pedestrian 101 is warned by the personal alarm device they are carrying and the operator is also warned by the PDSC 107 installed on the fork truck 103. Numerous Frederick patents provide explanations and illustrations that show how PDSC capability improves safety for many situations. There remains work to be done for other unsafe situations because there continues to be many harmful and costly fork truck accidents.

A potentially dangerous example that is more closely related to a primary objective of the current disclosure is also depicted in FIG. 1. As shown, a pedestrian 119 is working on the loading dock 100. Fork truck 105 is approaching portal 112 to service trailer 116. Pedestrian 119 is in the path of the truck 105. Pedestrian 119 might be in that portal area 112 in order to perform work, passing through portal area 112, or entering into or exiting from trailer 116. If pedestrian 119 happens to see the truck 105 approaching, and the facility has provided safe zones such as safe zone 123, then pedestrian 119 may be able to quickly move into the safe zone 123 along the path 124. Safe zone 123 in this illustration has been produced by installation of physical barriers 121,122. Fortunately, in this case, the fork truck 105 is shown to be equipped with a PDSC system 109 that will detect the personal alarm device (PAD) 125 being worn by pedestrian 119. This detection will provide sufficient time to both the operator of the fork truck 105 and the pedestrian 119 being warned to allow the fork truck 105 to be slowed down and for the pedestrian 119 to move into the safe zone 123. It should be noted that trucks may be in the adjacent portal areas, requiring the specific features disclosed here to avoid conflicts and confusion. Unfortunately, there can be significant complications and limitations present that will be described later and will be solved by the current disclosure.

Given that a docking portal has physical and operational characteristics that are different from most industrial arrangements, there are special functional features that are desirable in a proximity system, in addition to those that might typically exist for other materials handling operations. Therefore, it will be helpful to fully understand the desirable features of the combined PDSCs on the fork trucks, the PADs, and the DAC to work together. The following list highlights some key features of the collective system in a typical loading dock arrangement depicted in FIGS. 1, 5, 6, 7, 9. Subsequent paragraphs will then describe how PDSC, PAD, and DAC may function in order to provide these features.

1. Fork trucks on a roadway will detect pedestrians on or near the roadway, who are carrying PADs. The operator of the fork truck and the pedestrian will be given an alert when separation reduces to a range of from about 35 feet to about 40 feet, and a more significant alert when separation reduces to a range of from about 25 to about 30 feet. These alert ranges are adjustable and also are controllable by the PDSC.

2. Fork trucks that travel along roadways on a dock to deliver products to trailers being loaded and unloaded, if approaching another truck in the other lane, will provide brief alerts to the operators, by their PDSC systems. If one fork truck is trailing another, the PDSC will provide an alert to encourage the operators to adjust their speeds so that they are at least 30 feet apart. If a fork truck is parked at the side of a roadway, approximately perpendicular to the roadway, the fork truck in the roadway will be given an appropriate warning and the fork truck parked perpendicular to the roadway, or moving less than 2 feet per second, will be given a command by its PDSC to stop until the fork truck on the roadway is moving away or is out of range. However, if the PINGs indicate that the trucks are separating, there will be no warnings and no automatic action.

3. If a first fork truck has just exited from a portal area within the past five seconds, and it receives an ECHO that indicates a second fork truck is approaching, the PDSC on the first fork truck will determine from analysis of the magnetic field vectors or from compass readings if it is approximately perpendicular to the approaching fork truck. The first fork truck will stop or remain stopped until the second fork truck has begun moving away or is out of range.

4. Fork trucks that begin to turn off the roadway to enter a portal area will detect a DAC which will then change the mode of operation of the PDSC from a roadway mode or standard mode for operating in areas away from a portal area (standard mode) to a mode for operating in the portal area (portal modeportal mode). Upon activating the portal mode-portal mode, the fork truck will slow to a lower speed, shrink its magnetic field, turn off the detection of the 3 millisecond magnetic pulses from other fork trucks, and reduce the duration of its PINGs and ECHOs so that they will not be detected by other fork trucks and to allow PADs to distinguish between trucks in the portal area from those in the roadway. All of the parameters can be adjusted to optimize for a specific facility.

5. Fork trucks in the portal mode will communicate with the DAC to acquire its identification (I.D.) and other information, which will be time stamped, and then be transmitted to the fork truck systems via RS-485 or CANbus. It will also be stored in a data module and then be automatically downloaded to a RELAY for transmittal to the Cloud, which will produce reports as requested.

6. The PDSC will analyze the ratio of the reference PINGs to the In/Out PINGs from a DAC, using DAC Electronics Module (DEM) to determine if the fork truck is entering into the trailer being serviced or is exiting out to the roadway. If the fork truck is determined to have exited from the portal area, portal modeportal mode will be terminated.

7. Design the Dock Area Controller to be quick and easy to install at a low cost.

8. The DAC will provide silent spots to generate silent spot fields, adjacent to the portal areas, within or generally coextensive with provided physical barrier safe zones, where the PADs will not respond to the pulsed low frequency magnetic fields from any trucks, whether in the roadway or in the portal area.

9. DACs will utilize concurrent transmission technology to ensure a very high reliability.

10. PADs carried by workers who are in the portal areas preferably respond to PDSCs on fork trucks in the portal areas but preferably do not respond to the PDSCs on fork trucks traveling on the roadway unless the workers get too close to the roadway.

SUMMARY

The present disclosure relates to a dock area control system including a vehicle having a vehicle proximity detection system (PDSC). The PDSC includes a vehicle low frequency magnetic field generator (MFG) that generates a vehicle pulsed magnetic field. The vehicle pulsed magnetic field defines a vehicle marker field, wherein the boundaries of the vehicle marker field are at an equal vehicle threshold strength of the vehicle magnetic field. The duration of the pulses of the vehicle pulsed magnetic field are selectable between a standard duration in a standard mode and a portal duration in a portal mode. The standard duration is different from the portal duration, the standard duration being about 3 milliseconds and the portal duration being about 2.3 milliseconds. A vehicle low frequency magnetic field detector is associated with the vehicle and detects pulsed magnetic marker fields and the duration of the pulses of pulsed magnetic marker fields. A vehicle radio frequency (RF) signal generator is associated with the vehicle and generates RF signals. A vehicle RF signal detector is also associated with the vehicle and detects RF signals.

The system also includes a dock area controller (DAC) having a dock electronic module (DEM), that generates a marking field. The DEM includes a microprocessor, a low frequency MFG that generates a pulsed magnetic field defining a DEM marker field. The boundaries of the DEM marker field are at an equal threshold strength of the magnetic field pulses. The low frequency MFG includes a reference component that generates a reference pulsed magnetic field oriented in a reference direction. An in/out MFG component generates an in/out pulsed magnetic field oriented in an in/out direction. The in/out direction is at a DEM MFG component angle to a horizontal reference direction. In certain embodiments, the MFG component angle is below a horizontal plane that includes the reference direction, wherein the MFG component angle is in a vertical plane that includes the reference direction. In certain embodiments the MFG component angle is preferably from about thirty (30) degrees to about sixty (60) degrees. The in/out MFG component is positioned a MFG component distance from the reference MFG component, wherein the MFG component distance is in the reference direction. In certain embodiments, the MFG component distance is preferably from about eight inches to about twelve inches.

The reference MFG component generates the reference pulsed magnetic field having a reference pulsed magnetic field duration, the reference pulsed magnetic field duration extending from a reference pulsed magnetic field start time to a reference pulsed magnetic field end time. The in/out MFG component generates the in/out pulsed magnetic field having an in/out pulsed magnetic field duration. The in/out pulsed magnetic field duration extends from an in/out pulsed magnetic field start time to an in/out pulsed magnetic field end time. In certain embodiments, the in/out pulsed magnetic field duration occurs after the reference pulsed magnetic field duration, wherein the in/out pulsed magnetic field start time occurs after the reference pulsed magnetic field end time. In certain embodiments, the in/out pulsed magnetic field start time occurs about the same time as the reference pulsed magnetic field end time. In certain embodiments, the reference pulsed magnetic field duration is preferably about one thousand (1000) microseconds. In certain embodiments, the in/out pulsed MFG duration is preferably about one thousand (1000) microseconds.

The DEM low frequency generator is electrically connected to the DEM processor and a tuned circuit that includes an inductor and a capacitor. A DEM magnetic field detector is associated with the DEM and detects magnetic marker fields, and detects the duration of the pulses of pulsed magnetic marker fields. A DEM RF signal transceiver including a DEM RF signal detector is associated with the DEM and detects RF signals. A DEM RF signal generator is associated with the vehicle and generates RF signals.

In certain embodiments, the system includes a safe spot low frequency MFG that generates a pulsed safe spot magnetic field defining a safe zone field, wherein the boundaries of the safe zone field are at an equal threshold strength of the safe spot magnetic field pulses.

In the standard mode, the PDSC generates a low frequency magnetic field standard PING for the standard duration, listens for a DEM ECHO for a DEM ECHO duration of approximately 1.25 milliseconds, listens for a PAD ECHO for a PAD ECHO duration of approximately 1.5 milliseconds, listens for a PDSC ECHO from other PDSCs for a PDSC ECHO duration of approximately 1.5 milliseconds, and switches to the portal mode upon receiving a DEM ECHO.

In the portal mode, the PDSC adapted listens for an RF signal, generates a low frequency magnetic field portal PING for the portal duration and concurrently generate a RF frequency data signal for the portal duration, listens for a DEM low frequency magnetic field PING for a DEM PING duration of 1.25 milliseconds, listens for a PAD ECHO for a PAD ECHO duration of approximately 1.5 milliseconds, determines the ratio of the field strength of the DEM PING during a reference half of the DEM PING duration divided by the field strength of the DEM PING during an in/out half of the DEM PING duration, determines based on the ratio the direction and/or speed of the vehicle, to generate an RF signal indicative of the direction and/or speed of the vehicle, and switches to the standard mode upon either no longer receiving a DEM ECHO or receiving instructions to switch by RF signal.

In the standard mode, the DEM listens for an RF signal, generates a low frequency magnetic field standard PING for the portal duration and concurrently generates an RF frequency data signal for the portal duration.

In the portal mode, the DEM listens for an RF signal, listens for a PDSC low frequency magnetic field PING ECHO for the portal duration, and generates an RF frequency data signal including instructions to the PDSC to switch to the standard mode.

Additional features, advantages, and embodiments of the disclosure may be set forth or apparent from consideration of the following attached detailed description and drawings. It should be understood that features of a single embodiment, or aspect, may be combined with features of another embodiment, or with other aspects. Moreover, it is to be understood that both the foregoing summary of the disclosure and the following attached detailed description are exemplary and intended to provide further explanation without limiting the scope of the disclosure as claimed.

BRIEF DESCRIPTION OF THE DRAWINGS

FIG. 11A is an end view of the DEM of FIG. 11; and

DETAILED DESCRIPTION

Three elements of the current disclosure are a PDSC integrated into a vehicle such as a fork truck, PADs which are worn by pedestrians and a DAC electronics module (DEM). The PDSC mainly provides the functions of a MFG/CAD which is discussed in detail in previous Frederick patents and space will not be used here to repeat that information. The DEM is a new device that alters how the PDSC and the PAD function and communicate, and cooperates with them to expand the overall system capability. In order to transmit data from the PDSC to the Cloud, a device, called a RELAY, is deployed that accepts data via Bluetooth and then transmits the data to the Cloud via a cell link. The result is a much smarter system for application to loading dock areas and to other areas in materials handling facilities.

Figure 2:
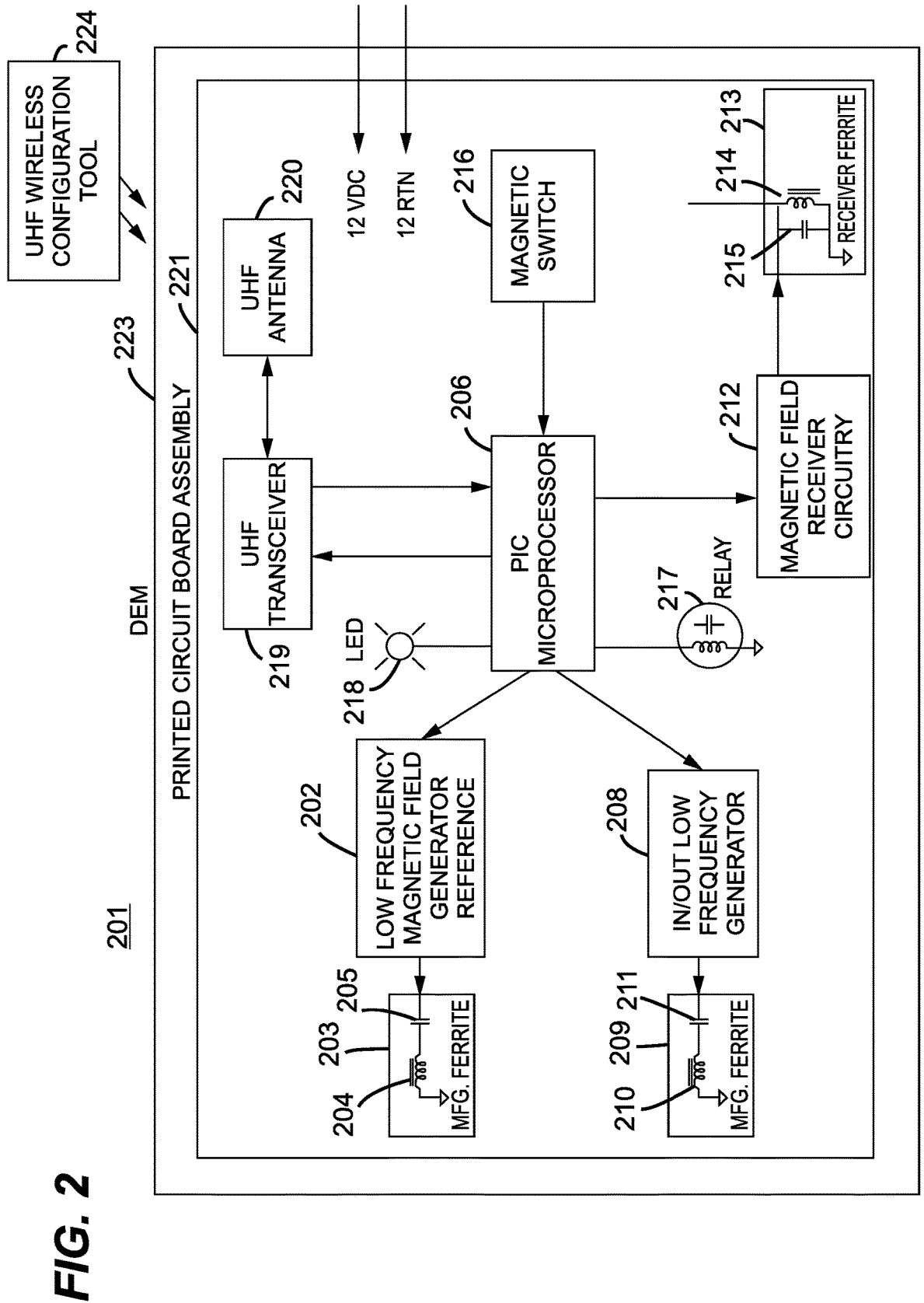
FIG. 2 is a block diagram of one embodiment of a dock area controller electronics module (DEM) in accordance with the present disclosure.

The DEM disclosed here can communicate with PDSCs and PADs in both the low frequency magnetic field spectrum and the ultra-high frequency (UHF) radio frequency (RF) spectrum. Use of extremely high frequency (EHF) RF might also be possible without departing from the principles of this disclosure. This requires a way to generate and receive low frequency magnetic PINGs and ECHOs; and also transmit and receive higher frequency RF pulses. FIG. 2 is a block diagram that depicts the electronic elements of one embodiment of a DEM 201 in accordance with the principles of this disclosure. 202, 208 produce PINGs and ECHOs of pulsed low frequency magnetic fields. Control of the generators 202, 208 is performed by a microcontroller 206. As shown, three low-frequency inductor-capacitor (LC) circuits 203, 209, 213 each includes a wire-wound ferrite 204, 210, 214 and a capacitor 205, 211, 215. Loops may be used in lieu of ferrites. One of these pulsed low frequency magnetic devices is a receiver 212, which uses the LC circuit 213 to detect magnetic PINGs and ECHOs from other generators. The UHF transceiver 219 is connected to a UHF antenna 220. Since the microcontroller 206 controls the functions of the generator 202, 208 and UHF RF transceiver circuitry 212 it has the capability of sending and receiving low frequency magnetic PINGs and ECHOs and RF emissions in many combinations as will be shown later. DEM 201 may further include at least one light emitting diode (LED) 218 that can be used to indicate operational state of the DEM or for any other suitable purpose.

In addition to marking locations, the DEM 201 also needs the capability to determine the direction of travel of vehicles within its range to transmit data related to the location that it is identifying and also acquire data related to vehicles and pedestrians within its range. The ferrite 204 is oriented parallel to the floor and is called the reference generator while ferrite 210 is oriented at approximately 45 degrees from the floor and is called the in/out generator 208. Each generator 202, 208 produces a magnetic field pulse that is approximately 1000 micro-seconds long. The pulse length can be adjusted in combination with adjustments of other elements of the system. The PDSC on any fork truck passing under any DEM 201 measures the composite strength of each of these ferrites 204, 210 and calculates their ratio. The ferrites 204, 210 are also offset on the circuit board 221 in the longitudinal direction by approximately 8 inches to 12 inches. In the illustrated embodiment the circuit board 221 is planar and oriented in a vertical plane intersecting the trailer and the roadway 50. The longitudinal direction is the direction towards the roadway 50 along the long axis of the reference ferrite 204, and may be referred to as the reference direction. The reference ferrite 204 is positioned closer to the roadway than the in/out ferrite 210, in the longitudinal direction. The reference ferrite 204 may be positioned lower than the in/out ferrite 210 on the circuit board 221 to increase the separation of their respective magnetic fields as sensed by the PDSC on the fork truck. For example, the reference ferrite 204 (oriented about horizontally) may be placed at the front bottom of the circuit board 221, and the in/out ferrite 210 (oriented down at about 45 degrees) may be placed at the rear top of the circuit board. The offset accentuates the comparative readings because the field strength decreases at a rate proportional to the cube of the distance. PINGs are sent from the two ferrites 204, 210 at a statistically produced rate having an average spacing of approximately 200 milliseconds. By operating the two generators 202, 208, with generator 208 following immediately after generator 202, it is possible to compare the ratio of the signal strengths in a short period of time, namely within the aggregate length of time of the two PINGS which is 2 milliseconds. As a fork truck passes under the DEM 201, the ratio of each pair of readings can be compared. If the truck is moving one direction relative to the DEM 201, the ratios calculated in the PDSC on a fork truck will be markedly different than if the truck is moving in the opposite direction. Thus, the DEM 201 allows the PDSC on the truck to determine with certainty which direction it is moving.

Figure 9:
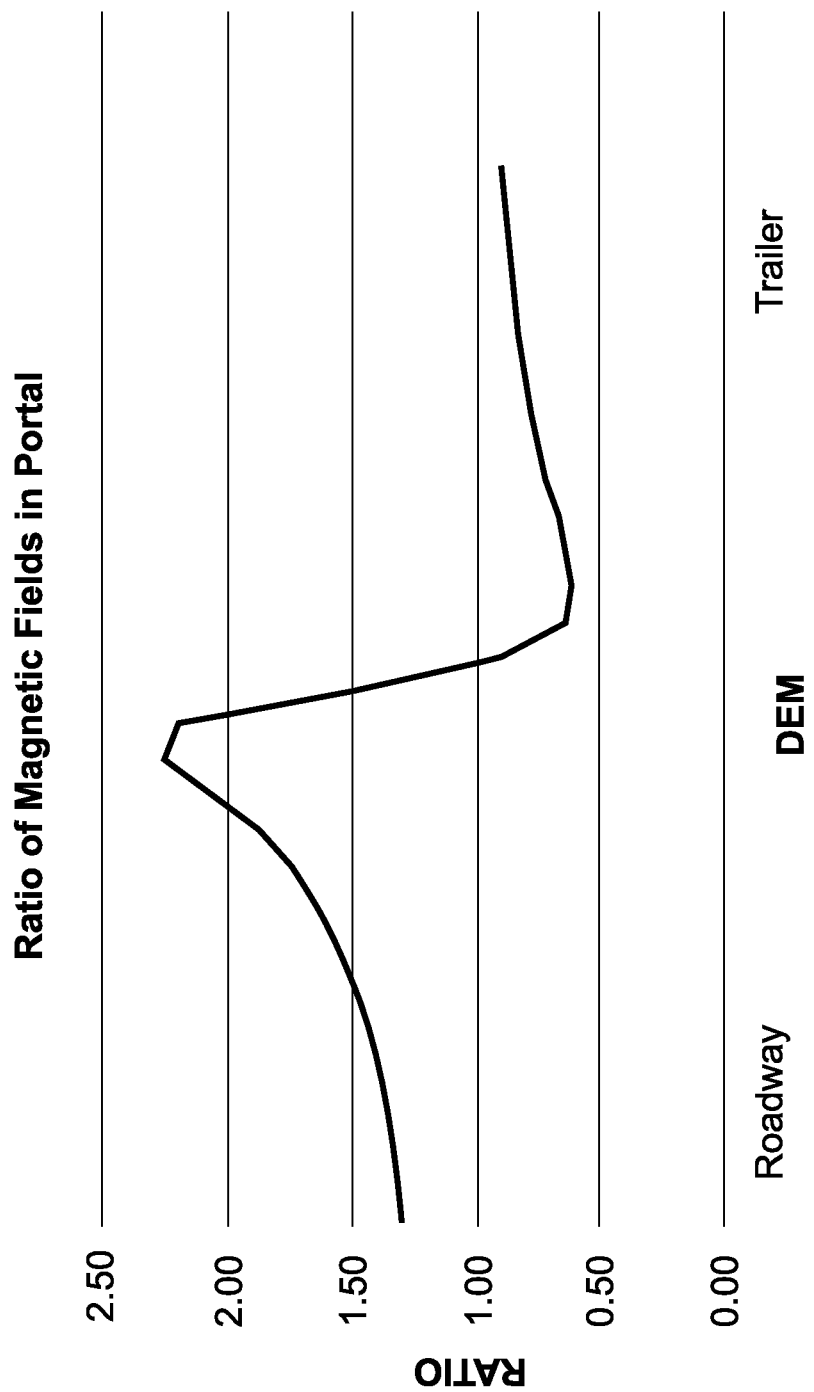
FIG. 9 is a graph showing ratios of the DEM magnetic fields.

FIG. 9 depicts an example of the ratios that may be produced by an embodiment of this process. Referencing FIGS. 2, 5 and 9, an example setting of parameters may be as follows for a DAC system 500 for an exemplary trailer portal facility as described herein. Other settings might be chosen for a similarly or differently configured facility. The software in the PDSC 505 of the fork truck 501 will recognize magnetic fields 513 from the DAC 529 and DEM 201201 at approximately 10 to 12 feet when the strengths of the two fields, produced by the two ferrites 204, 210, exceed a voltage threshold in the PDSC 505 that has been selected at the factory or as adjusted with the UHF wireless configuration tool 224. The PDSC 505 will also produce a ratio value indicative of the PDSC-sensed reference field strength divided by the PDSC-sensed in/out field strength (R/IO Ratio). Alternatively, in other embodiments, the PDSC 505 may produce an inverse ratio value indicative of the sensed in/out field strength divided by the sensed reference field strength. In the illustrated embodiment, the R/IO Ratio is determined by the software in the microprocessor 206 of the PDSC 505, however in other embodiments, hardware electrical components may be used, particularly in non-variable environments where adjustment of set-points is less desirable. In the illustrated embodiment, the R/IO Ratio between the strengths of the two fields produced by the two ferrites 204, 210 in the DAC 529 DEM 512, is greater than 1.1 when the PDSC 505 is positioned between the DEM 512 and the roadway 524. DEM 512 is constructed in the same way as DEM 201 described above. And the R/IO Ratio is less than 1.1 when the PDSC 505 is positioned between the DEM 512 and the trailer 527. When the PDSC 505 is approaching the DEM 512 from the direction of the roadway 524, the R/IO Ratio will increase rapidly as the PDSC 505 passes under the DEM 512. The R/IO Ratio will be less than 1.1 when approached the DEM 512 from the direction of the trailer 527 and will reduce to a smaller ratio before beginning to rise as the PDSC 505 passes under the DEM 512. When moving from under the DEM 512 to away from the DEM 512, going toward the roadway 524, the R/IO Ratio will initially be high and will reduce toward a value slightly above 1.1. If leaving the DEM field 513 while going into the trailer 527, the R/IO Ratio will rapidly reduce to a minimum value and then rise toward a value slightly under 1.1. A reliable logic that provides a margin for error is: A change in the R/IO Ratio from a value above 1.25 to the value of 1.25 will result in the state "exiting to roadway." A reduction from a value below 1.25 down to a value of 0.85 or less will establish the state "entering a trailer." Once a state has been established, it will be retained until the DEM field 513 strength at the PDSC 505 drops below the discriminator setting or the R/IO Ratio exceeds 1.6.

Adjustments to the parameters in DEM 201 can be made with the UHF wireless configuration tool 224 and small adjustments can be made with a magnetic switch 216. All the DEM 201 functional elements are placed on a Printed Circuit Board Assembly 221. The Printed Circuit Board Assembly may be placed in any suitably sized non-metallic enclosure 223.

Figure 3:
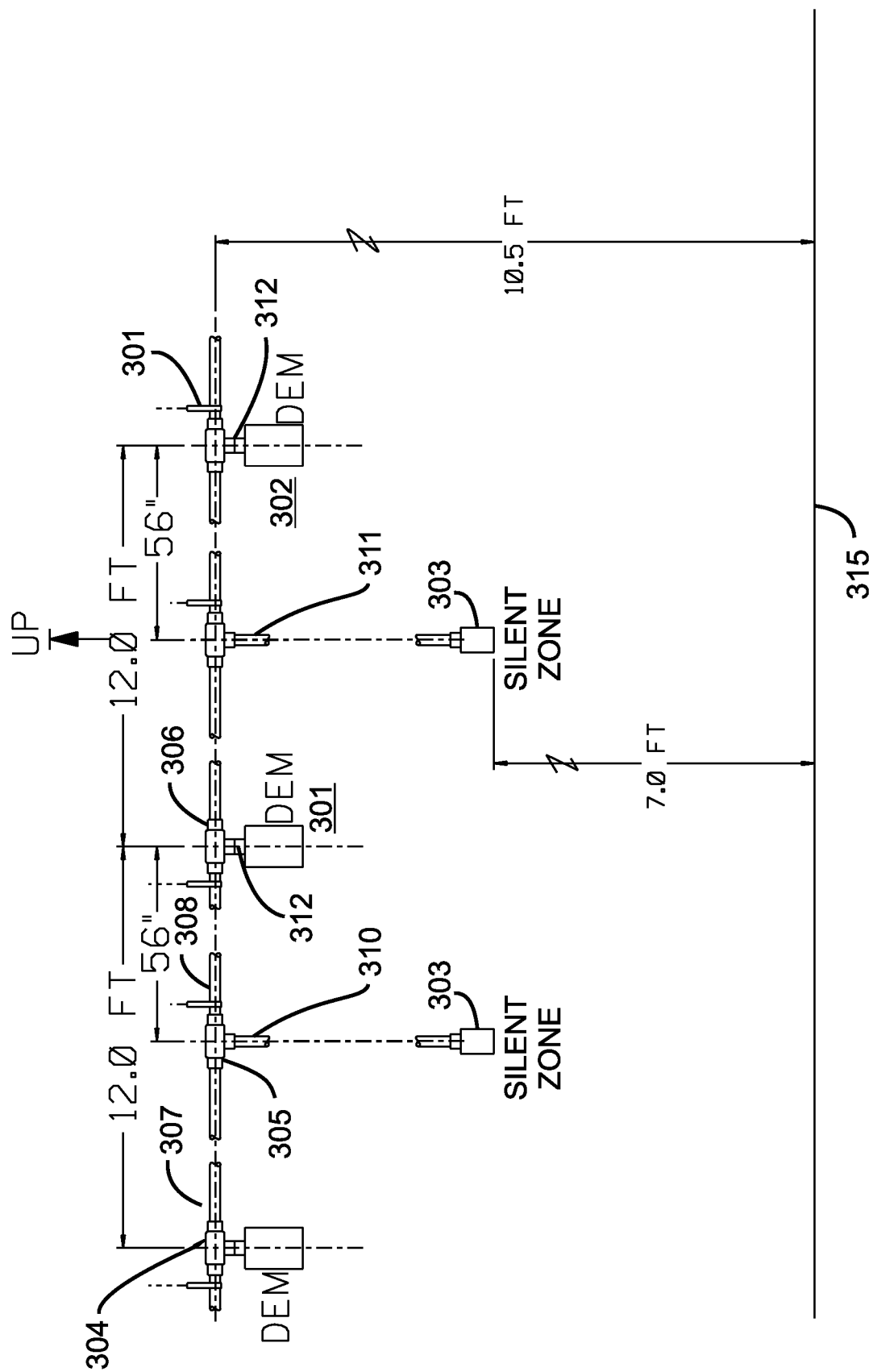
FIG. 3 is a schematic view of one embodiment of a dock area controller (DAC) in accordance with the present disclosure.
Figure 6:
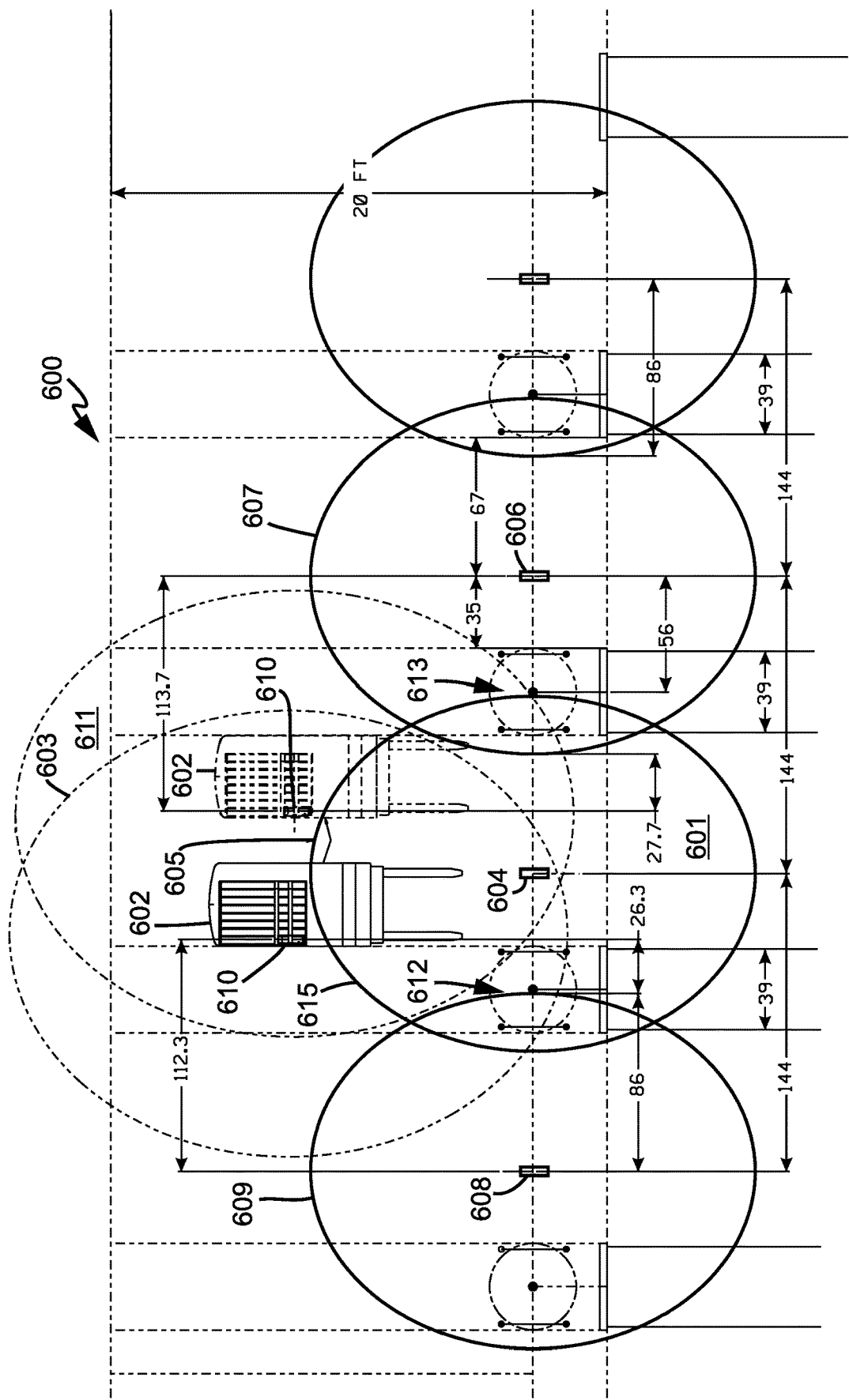
FIG. 6 is a schematic top view of another embodiment of a layout of a loading dock showing DEM Fields and silent spots for trailer spacing of 12 feet.
Figure 7:
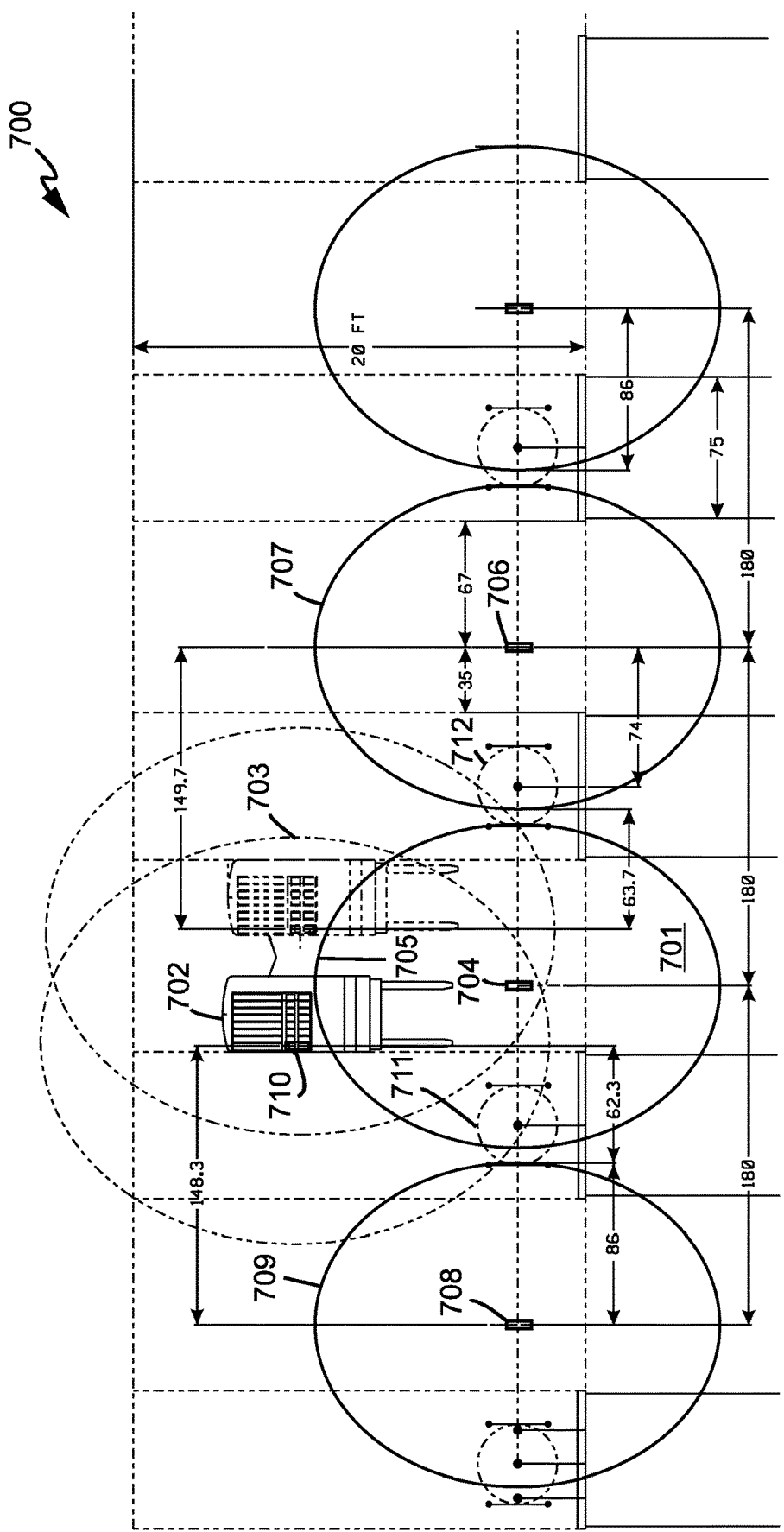
FIG. 7 is a schematic top view of another embodiment of a layout of a loading dock showing DEM Fields and silent spots for trailer spacing of 15 feet.

In order to reduce hardware cost and installation cost, a novel and simple mechanical configuration of the DAC assembly is depicted in FIG. 3. Shown is a segment of a DAC system suited for docking ports. Polyvinylchloride (PVC) electrical junction boxes 303, 305 are connected by PVC electrical conduit 306, 307, 308, 310 to correspond to the spacing of the trailer portals with junction boxes assigned to individual portals. FIG. 6 shows the spacing between the junction boxes for the DEMs 604,606,608 and the silent spot fields 612, 613 for a facility that is configured for the trailers in portals adjacent to one another to be spaced each 12 feet, the minimum spacing allowed. Each DEM in the DAC is enclosed in a non-metallic housing that is attached to the junction boxes. FIG. 7 gives the dimensions for a facility that positions the adjacent portals every 15 feet along the dock indicating the location of the junction boxes and associated DEMs 704,706,708. DEMs 704, 706, 708 are constructed in the same way as DEM 201 described above. Note that in FIG. 6, that when the truck 602 is on the left side the nearest PDSC 610 passes to the field from DEM 608 is 26.3 inches. If the truck is on the right side, the nearest it passes to the field from DEM 606 is 27.7 inches. DEMs 606, 608 are constructed in the same way as DEM 201 described above. This should be adequate margin to allow for slight errors that might be made in the positioning of the DEMs in the DAC. By reducing the size of the fields of the DEMs, the margins can be increased. Referring to FIG. 7, where the trailers are all spaced 15 feet apart, the margins are much greater. When truck 702 is in the left position, there is 62.3 inches margin between the field 709 of DEM 708 and the PDSC 710. When truck 702 is on the right side, the margin between the field 707 of DEM 706 is 63.7 inches.

Figure 5:
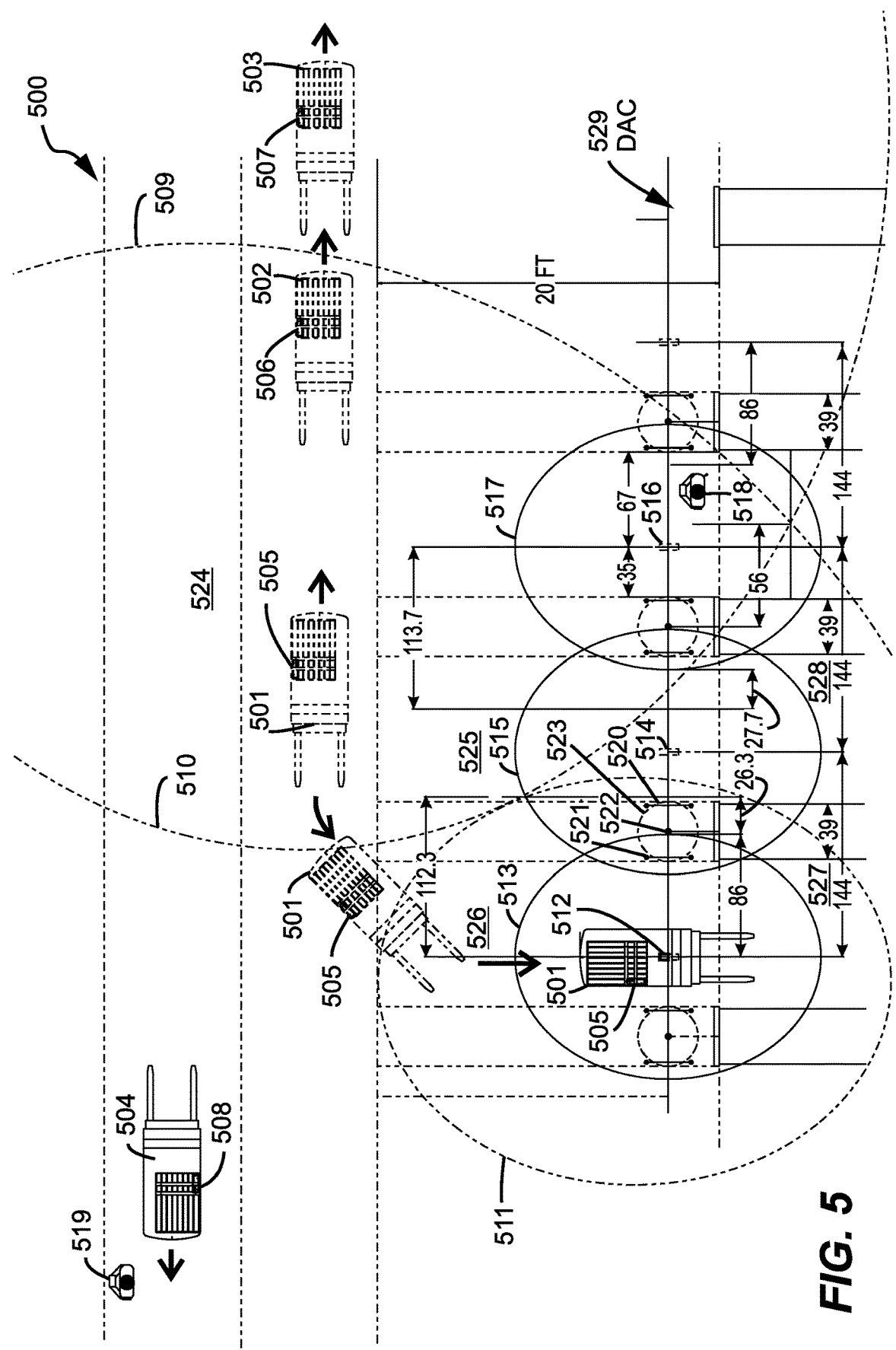
FIG. 5 is a schematic top view of one embodiment of a layout of a loading dock, showing fork trucks exiting a roadway and entering a portal area.

It is preferable for safe zones to be provided at the edge of the portal areas. For example, safe zones are depicted in FIG. 5. Silent spot field 523 is produced by a silent spot 522 that is positioned midway between safe zone barriers 520, 521. The positioning of the junction boxes 303, 305 is established by the length of conduit 306,307,308 and all similar segments of conduit along the length of the DAC system 500. Most facilities place all the portals with a fixed spacing so that the conduit segments would be the same length. However, if there are variations in the portal spacing, this is easily compensated for by adjusting the lengths to place the junction boxes in the optimum location. If the portal spacing is wider, the positioning is less critical as explained in the above paragraph. A simple chart can be made to show the needed distance from one side of the portal area.

Since all the elements of the necessary to install a DAC system would typically be standard electrical components typically used by most any electrical contractor, assembly should be quick and not require any special documentation other than the distance from one side of the area and a height for the DAC system to be suspended above the portal area. The conduit will only contain two wires to carry a small amount of electrical power for powering all DEMs and silent spot circuits. Power will be low voltage, such as 12 volts direct current (VDC) by a commercially available power supply. A single supply may provide power for up to 50 portals. Fork trucks that are suitable for loading trailers preferably have short masts so that height of the DEM can also be low, only providing for an appropriate amount of clearance. As shown in the FIG. 3, a typical height for the silent spot would be about 7.0 feet, slightly taller than any pedestrians. However, this is not critical and can be changed by adjusting the size of the silent spot field from the silent spot. Similarly, the DEMs should be approximately two feet above the PDSCs on the fork trucks and this can be adjusted as well. Most of these considerations are intuitive and easily determined when the facility is surveyed by an engineer or trained technician. Silent zones and silent spots are described in previous Frederick patents.

The following paragraphs describe how the PDSC, PAD, and DAC operate in a cooperative and sequential manner to accomplish the functions of the element configurations summarized above. Other, detailed performance features that make the PDSC and PAD systems more reliable, more accurate, and user friendly are described in earlier Frederick patents. Integrated functionality accomplished through synchronized communications between elements, combined with utilization of two widely separated spectrums create a novel composite system that accomplishes safety enhancements and acquires highly reliable data.

One way to visualize how this system functions is to begin by discussing fork trucks equipped with PDSCs that are traveling along a roadway, then describe the actions and responses at the time that the truck turns into a portal area, then describe how the system elements cooperate while the PDSC is in the portal area, and, finally, describe how the system elements interact and cooperate as the truck with its PDSC exits from the portal area into the roadway.

Turning now to FIG. 5, while fork trucks are traveling on a roadway 524, it is imperative that the PDSCs 505, 506, 507, 508 on the fork trucks 501, 502, 503, 504 provide for pedestrian proximity detection and collision avoidance capabilities. For example, if pedestrian 519 strays onto or crosses the roadway 524, vehicles on the roadway 524 such as the fork truck 504 should detect the PAD 125 carried by the pedestrian 519 and then take actions. The actions may be for the PDSC 508 to give an alarm to the operator of the fork truck 504 and the PAD 125 to give a warning to the pedestrian 519. The actions may also include automatically slowing or stopping the truck 504, depending upon the details about the facility operation. Also, fork trucks following too closely together as indicated by fork trucks 502 and 503, the operators should be given a special warning so that they will adjust their speeds to provide more separation. Operators should also be given some kind of non-offensive alert, possibly a couple of short, soft beeps, when they are approaching another fork truck head-on such shown by fork truck 504 approaching fork trucks 501,502,503. These steps can be taken because repetitive readings of the ECHOs can be used to determine the rate of approach or separation.

An important characteristic of using low frequency magnetic fields is that they provide proximity detection for all 360 degrees around a vehicle. This is important because there are many types of accidents other than a pedestrian or truck being directly in the path of travel of a second truck. Fork trucks sometimes push objects against pedestrians, pinching or crushing them. Payloads sometimes fall from truck forks and strike pedestrians. Feet are crushed after a pedestrian has been standing at the side of a stopped truck. It is also important that the range of the low frequency magnetic fields be sufficient for the speed of the vehicles and for the arrangement of the facility. In situations as depicted in FIG. 5, where trucks may be traveling at maximum speed allowed by company policy, the range of the magnetic fields need to be large to give time to respond to a detected danger. In this situation, the sides of the magnetic fields extend from the roadway 524 into the portal areas 525,526 and possibly even into the back of the trailers 527,528 and others. Persons working at the back of the trailers 527,528 such as pedestrian 518 will be inside the magnetic fields 509,510. They will be alarmed, if not inhibited, and so will the operators of passing fork trucks 501,502,503,504. They should not be alarmed because they are safe when near the trailers. If they move toward the roadway 524, at some point, they should be alarmed because they can be in danger. So, the challenge is to provide detections, alarms, and actions when they are needed but only when needed. Essentially, what is needed is for the PADs 125 carried by pedestrians working near the trailers to respond to trucks arriving at the portal where they are working but not to respond to trucks traveling along the roadway. This requires a more complex, smarter system than previously available.

The DAC 529 includes DEMs 512,514, and others along the dock. These DEMs 512,514 are constructed in the same way as DEM 201 described above and will modify the way that the PDSCs on the fork trucks function and also change the way that any PADs 125 in their range function. This will be explained in the next section.

DEMs in the DAC preferably do not respond to trucks that are traveling along the roadway 524. This is made possible by reducing their sensitivity to not detect the PINGs from any trucks on the roadway. One aspect of the DEM design is that the ferrite 214 is oriented perpendicular to the roadway and the magnetic fields at the trailers from PINGs produced by PDSCs in the roadway are parallel to the roadway in the area behind the trailers. This perpendicular orientation, minimizes magnetic coupling to the PINGs. As a truck begins to turn into a portal area, its PDSC begins to get closer to the DAC and the orientation of the PING field begins to no longer be perpendicular. This change in orientation quickly boosts the magnetic coupling so that the DEMs in the DAC begin to detect the PINGs from the PDSC 505 on a truck 501.

It should be noted that during all phases of operation, PADs 125 outside the portal areas respond to trucks and PADs in the portal areas respond to trucks in the portal areas and send data packs that report proximity events for that PAD. PDSCs also report events. This information is immediately transmitted to the truck data system via RS-485 or CANbus standards for reporting along with other truck information. It is also sent to a data module which stores the data until the truck is within the range of a RELAY 217 (see FIG. 2) which will acquire the data via Bluetooth and then automatically transmit the data to the Cloud for reporting.

Proximity events related to trucks in close proximity with each other are handled in a similar manner.

If a fork truck 501 begins to turn off the roadway and into a portal as shown in FIG. 5, the magnetic field 511, 513 from its PDSC 505 will begin to reach the DEMs 512, 514 in the DAC 529 with enough strength so that the DEMs will begin to respond by sending ECHOs that are received by the PDSC 505. These ECHOs will have timing parameters different from standard ECHOs so that the PDSC 505 will recognize that they are from a DEM, rather than from a PAD or CAM. After multiple ECHOs are received, such as for example a total of three, the PDSC 505 will determine that it is entering the portal area and switch to the portal mode.

Figure 4:
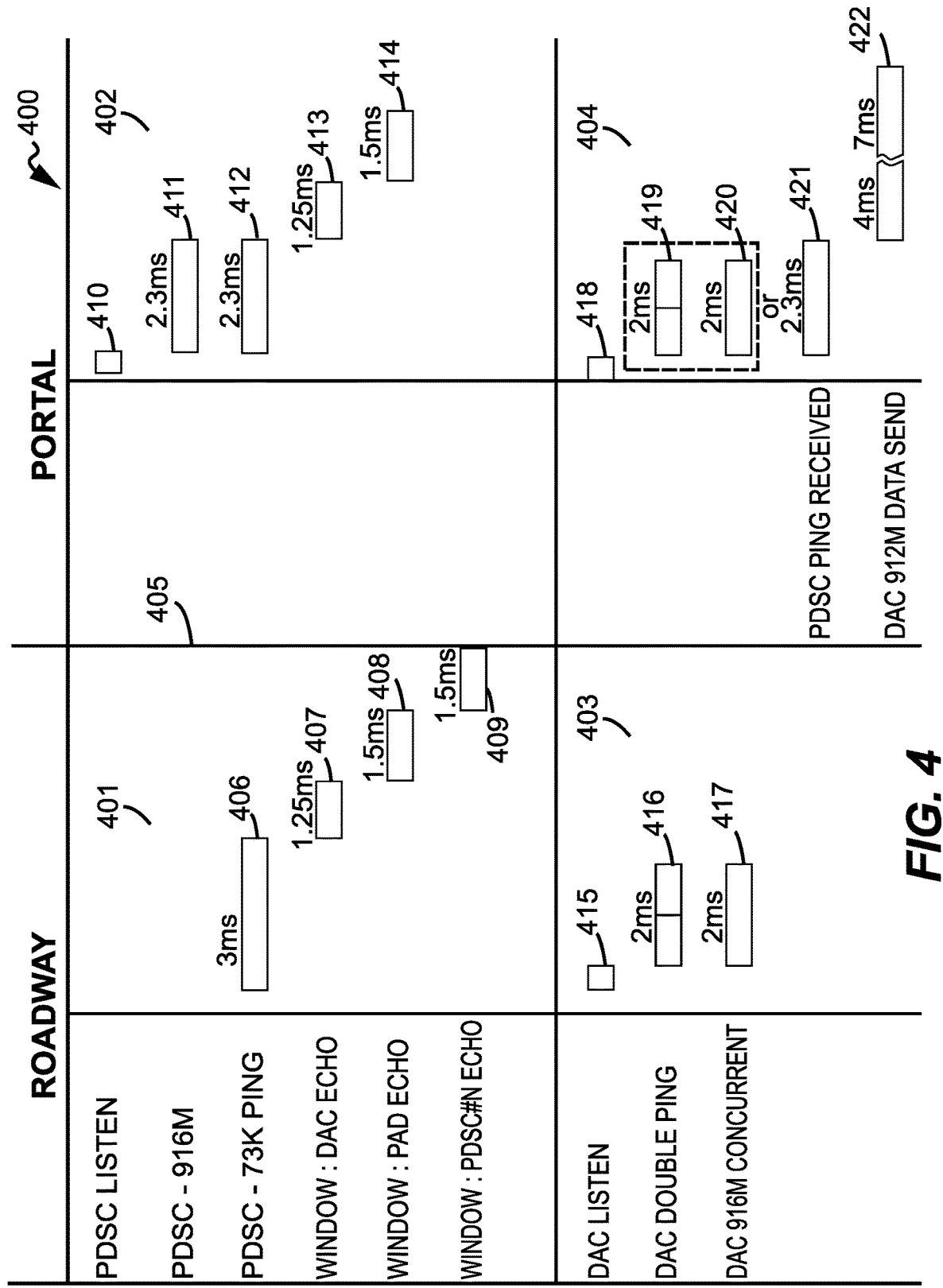
FIG. 4 is a schematic view of one embodiment PDSC and PAD timing while exiting a roadway into a portal area.
Figure 8:
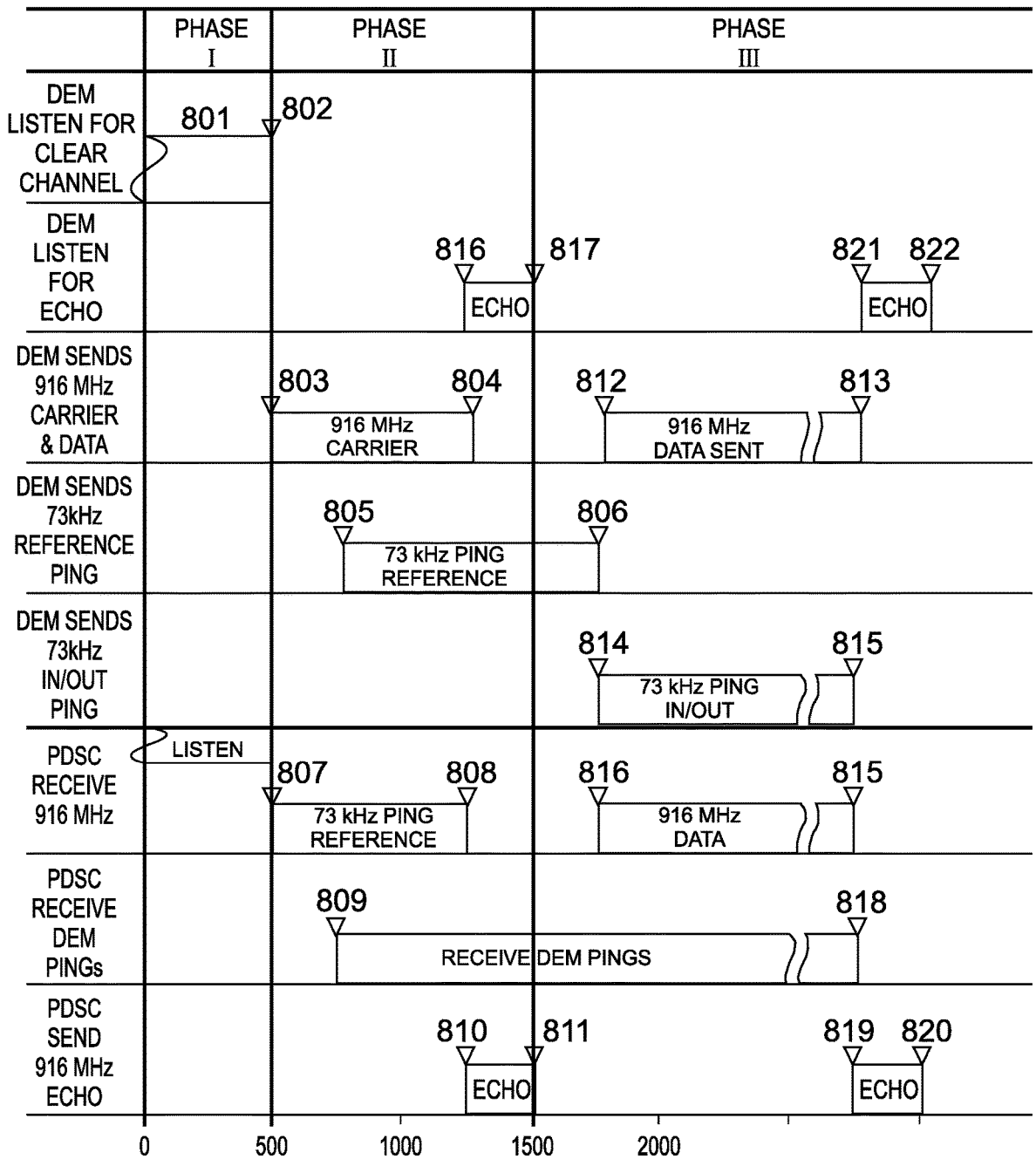
FIG. 8 is a schematic view of one embodiment of DEM pulse timing and PDSC timing.

Timing parameters for the PDSCs, PADs, and DEMs are depicted in FIG. 4 and FIG. 8. FIG. 4 shows how the parameters change as a fork truck turns off a roadway into a portal area. FIG. 8 gives more detail on timing parameters between the elements once a fork truck has entered into the portal area.

In order to understand the operation of the system, it is necessary to understand that the basic principle that the system elements each operate asynchronously; yet, are designed to minimize conflicts by use of fixed timing sets and concurrent transmissions. One advantage is that this approach allows each fork truck and each person wearing a PAD to be more independent, giving each person and each operator the confidence that they are in control of their own safety without dependence upon a centralized system that may fail to recognize or respond to the unique circumstances encountered. Importantly, if there is a problem with a PDSC, the fork truck can be sidelined while being repaired without disrupting other elements in the facility and without requiring the vigilance of special operators for a centralized system.

FIG. 4 shows that a PDSC 505 on a fork truck in the facility will be generating magnetic fields in a repetitive semi-random manner. It then has timing windows in which it expects to receive responses, called ECHOS, from PADs, or from other fork trucks. When in a portal area, it also has a window in which it expects that it may receive ECHOs from DACs. The left portion 401 of the FIG. 4 shows the key points in time for a fork truck that is on a roadway or other part of the facility, other than in a portal area. The right portion shows the modified timing after entering a portal area, the point of switch being indicated by 405.

Key timed actions by the PDSC 505 on a fork truck are shown in the upper portions 401,402 and the timed actions by the DEM 201 are shown in the lower portions 403,404.

Beginning with the upper left section of the FIG. 4, a PDSC 505 on fork truck 501 generates a 3 millisecond low frequency magnetic field 406. Afterwards, it has timed windows, created in the PDSC 505. One window 407 is designated for any ECHOs from a DEM, one window 409 for any ECHOs from PDSCs of other trucks, and one window 408 for ECHOs from any PADs. Each element is programmed to produce ECHOs that correspond in time to match the windows. In this portion 401 of FIG. 4, it is assumed that the fork truck of interest is not within the portal area but as the fork truck begins to turn into a portal area, one or more of the DEMs 201 on the DAC will begin to echo back to the PDSC 505 on the fork truck. If a sufficient number of ECHOs are received, the PDSC 505 on the fork truck will switch at time 405 to the portal mode, the timing being shown in 402.

Prior to changing to the portal mode, any ECHOs from a PAD or other PDSC on another fork truck will be responded to and the appropriate safety action will be taken and that proximity event will be recorded in the data.

Once a sufficient number (for example for some systems two or three may be sufficient) of DAC ECHOs are received by the PDSC 505, it will switch from the standard mode 401 to the portal mode 402 and the timing system will switch to the timed events shown on the right portion 402. In the portal mode, the PDSC 505 will listen for approximately 500 micro-seconds, shown as time 410, for any UHF signals that are above the set threshold. If none are detected, it will begin transmitting a UHF signal 411 to block other PDSCs in nearby portal areas from generating PINGs, and will begin to generate a PING 412 with a duration less than that for systems outside the portal area, typically 2.3 milliseconds. If a UHF signal is detected, it will delay its action for a few milliseconds, determined by a statistically controlled timer in the PDSC 505. PINGs generated by PDSCs outside the portal area, being 3 milliseconds in duration, will be ignored by PDSC 505 in the portal area. Likewise, any PINGs generated by PDSCs inside the portal area, being approximately 2.3 milliseconds in duration will be ignored by PDSCs and PADs outside the portal area. Timed windows are provided for PAD ECHOs and DAC ECHOs.

The lower left portion 403 of FIG. 4 shows how the DEM is timed when it is not receiving any 2.3 millisecond PINGs from a fork truck in its range and the lower right portion shows how the DAC 512 responds if a 2.3 millisecond PING is received.

Some of the most pertinent information regarding this disclosure is the communications that occur once a DEM responds to the PINGs which causes a PDSC to switch to the portal mode, at time 405. Exchanges of PINGs and ECHOs between the elements involved are then accomplished to a different timing protocol as indicated in the time frame 402 in FIG. 4. Once in the portal mode, the DEM issues two millisecond PINGs, divided into two parts, one part being issued from the ferrite that is parallel to the floor and the other ferrite being at approximately 45 degrees relative to the floor. Other PDSCs on other fork trucks, and PADs outside the field of a DEM, will not respond to this pair of PINGs. But, PADs 125 inside the field of a DEM will respond unless they are positioned within a safe zone that is equipped with a silent spot.

Once the PDSC 505 has switched to the portal mode, it will take five actions: (1) it will give a command to the fork truck 501 to reduce its speed to a specified maximum speed, (2) the power to the low frequency generator 202 will be reduced in order to reduce the range of the PDSC, (3) PINGs will be changed to only be 2.3 millisecond duration so that fork trucks in close proximity will ignore the PINGs, (4) it will stop detection of 3 millisecond PINGs from other fork trucks, and (5) it will begin listening for UHF RF pulses and associated low frequency PINGs that are produced by the DEMs. Use of the UHF pulses allows a more precise timing arrangement so that the multiple exchanges of signals can be accurately coordinated. Also, the data transfer can be accomplished within the available time. Higher RF frequencies provide even greater precision and allow more data to be output.

Reduction of the speed of the fork truck 501 gives the pedestrian 518 more time to move out of the path of the truck. It is normally good practice to move more slowly as the trailer is approached. Reduction of the power in the PINGs reduces the chances of the PDSC 505 alarming a PAD carried by a pedestrian in an adjacent portal area. Changing the duration of the PINGs prevent any trucks on the roadway from being affected by the truck 501 which is safely in the portal area. Once in the portal area, the remaining tasks are related to communicating with the DAC and any pedestrian in the area.

It is desirable that special safe zones be provided in locations that are adjacent to the portal area so that a pedestrian can quickly move into the area but also remain close by. Junction boxes 303 are spaced along the DAC 301 so that they will be positioned at the interface of portal areas where it is practical to provide barriers to produce safe areas. The silent spot 322 is attached to the junction box 303 and will mute the PADs 125 carried by any pedestrian at that location so that no warnings will be given to the pedestrian or the operator of the truck.

Design of the DAC system and the sizes of the fields are chosen to be compatible with the arrangement of a facility. Usually, there is a high degree of consistency between portal areas so that once a system configuration is selected, it will be repeated at each portal. If a distribution center has 200 portals and they are all identical, then once the parameters and dimensions are set for one portal, all others can be replicated. However, adjustments can be made on site to accommodate variations.

As shown in FIG. 6, a fork truck 602 may enter the portal area 601 on the right side or on the left side of the portal area, or anywhere in between. The fork trucks in this disclosure are assumed to be small, stand-up types but could be any type truck that is low enough to enter into the trailers. Correct positioning of the DEM is preferably somewhat more precise for narrower trucks since there is a wider range of possible PDSC locations and the separations between the adjacent portal areas are smaller. For best operation on a loading dock, the PDSC units should be located on the same side of the fork truck, preferably near the top of the canopy, and as near the longitudinal center of the truck as practical. DEMs would be positioned approximately midway between the most extreme left/right positions of the PDSC within the portal area in which the truck is located. FIG. 6 shows proper positioning for the minimum trailer spacing of 12 feet and FIG. 7 shows the larger margins for trailer spacing of 15 feet.

Magnetic pings with concurrent UHF pulses will be produced by DEMs 604, 606, 608, 704, 706, 708 at least two times per second but not more than about six times per second. As in the other embodiments described above, DEMs 604, 606, 608, 704, 706, 708 are constructed in the same way as DEM 201. These magnetic pings and UHF pulses will determine when the PDSCs 610, 710 on the fork trucks are within the precisely defined range of the DEMs 604, 606, 608, 704, 706, 708 but will also alter how the PADs 125 within the DEM range respond to PINGs. Once communications have been established by at least two link-up cycles, data can be sent to the PDSC 610, 710 from the DEM with very high reliability. Once the PDSC 610, 710 is positively confirmed to be within the DEM 604 range, the DEM will begin sending UHF pulses concurrent with its PINGs, which are produced in two segments. This will be explained better later and is illustrated in FIG. 8. Once a PAD 125 is within the range of a DEM 604, it will recognize the 2.3 millisecond PINGs and the concurrent UHF pulses and switch to the portal mode. While in this mode, it will not respond to the 3 millisecond pings from trucks in the roadway unless near the roadway, because the detection levels will be increased. When in the portal mode, they will respond to 2.3 millisecond PINGs and concurrent RF pulses from trucks that have entered the portal mode.

Fundamental to the cooperative functions between PDSCs, DEMs, and PADs is the timing of the elements. In order for pedestrians to be protected from incoming fork trucks while not disrupting normal travel on the dock roadway, for fork trucks in the portal areas to not affect or be affected by fork trucks on the roadway, for DEMs to not be confused by PINGs and RF transmissions from PDSCs in adjacent portal areas, and to acquire data with precision, an organized means of communication is necessary. At the same time, low power from all elements is desirable to minimize the ambient RF and magnetic noise in the facility.

Concurrent PINGs and RF transmissions from the DEMs such as DEMs 512, 514 are typically produced semi randomly with a minimum rate of about 2 per second and a maximum of approximately 6 per second.

Once the PDSC 505 has switched to portal mode, it begins to operate as required for that mode, rather than the standard mode required for being on the roadway 524. Once a PAD 125 is carried into the range of a DEM 512, 514, the PAD will respond to PINGs that are either 2.3 milliseconds long or 3 milliseconds. However, they will only respond to the danger level voltage (range) for 3 millisecond PINGs. Also, when 2.3 millisecond PINGs are received from a fork truck in the portal area, it will respond to the PING voltage level (range) that has been chosen for the configuration of the loading dock. If a pedestrian 518, 519 wanders out toward the roadway 524, they will begin to be warned by fork trucks on the roadway before reaching the roadway and but they will also continue to respond to trucks that enter the portal area. Note that the reduced PING duration of 2.3 milliseconds can be a different duration by altering the PING rejection criteria and making other adjustments.

In order to ensure high reliability, concurrent transmissions will be utilized. Precise RF transmissions will establish a timing reference that cannot be obtained from low frequency PINGs. For example, it is important to know with confidence whether a truck is traveling toward the trailer or traveling toward the roadway. It is also important to know with certainty that data being acquired is from the portal area in which a truck is located and not from an adjacent portal area. The timing chart in FIG. 8 explains how this is accomplished with reference to the DAC system configuration shown in FIG. 5 and indicates the precision preferred.

As shown, DEM 512 will have had its LF pulsed magnetic field 513 set by use of the adjustment tool 224 so that the range will fall short of reaching the PDSCs 505 in adjacent aisles. All DEMs 512, 514, 516 in the DAC will be elevated above the floor to allow low-profile fork trucks 501, 502, 503, 504 to pass under on the way to and from the trailers. For example, for a typical height of the canopy of about 7.5 feet, the DEM 512, 514, 516 height may be about 10.5 feet.

DEM 512 and PDSC 505 timing parameters are depicted in FIG. 8, but can be adjusted in multiple ways in order to be optimized for the specific hardware elements being used. In order to have maximum confidence in the connection between the DEMs 512, 514, 516, PADs 125 and PDSCs 505, a burst sequence can also be incorporated as described in earlier Frederick patents.

Numerous, precisely timed RF Pulses and magnetic PINGs cooperate together so that the DEM and the PDSC will establish with high reliability that a specific pair of fork trucks and DEMs are communicating only with each other. Precise timing also allows data sets to be sent from the DEM 512 to the PDSC 505 meshed in with the PINGs and RF pulses.

The embodiment of the timing profile shown in FIG. 8 begins with the DEM 512 listening for 500 micro-seconds, terminating at the point 802, to verify that there are no other nearby DEM or PDSC 505 systems in operation. If another system is in operation, the DEM 512 will delay a statistically determined amount of time before attempting to transmit. Without this statistical factor, there could be a pileup immediately following the completion of a cycle. The cycle would be initiated at time 803 by the transceiver in the DEM 512 beginning to emit 916 million cycles per second (MHz) for a total of 750 micro-seconds to a time 804. If there was no on-going PDSC activity prior to start of the current sequence, the PDSC 505 on truck 501 would be listening as was the DEM 512. The PDSC 505, will detect the DEM 512 signal and continue to listen for the signal to terminate, which is time 804. The PDSC 505 will recognize that the 73 thousand cycles per second (kHz) PING began at 250 micro-seconds after start of the 916 carrier and interpret these signals as originating from a DEM and will begin recording the magnetic PING at time 809, which corresponds to time 805. Since the magnetic fields have been separated, there will not be a conflict with other DEM magnetic fields. The actual I.D. of the DEM 512 will be transmitted to the PSDC 505 later in the sequence.

After the DEM 512 has completed its 916 MHz at time 804, and has initiated the 73 kHz at the expected time for a DEM, the PDSC 505 will initiate a 916 MHz ECHO that starts immediately following the termination of the time 804. Meanwhile, the DEM 512 will have been expecting an ECHO to arrive at its RF transceiver at time 816 and terminating at time 817. Having completed these steps, both the PDSC 505 and the DEM 512 will have confirmed that the two units are linked and can continue into Phase III.

Two main objectives are to be satisfied by Phase III. A time slot is established during which the DEM can transmit its I.D. and a small amount of other data. If other PADs 125 are in the range of the DEM 512, their I.D.s will also be sent in a second 7 millisecond data pack. And, time has been provided for the second period of low frequency (73 kHz) generation. The reason for the two separate PINGs, time 805 to 806 and time 814 to 815, is to allow determination as to whether a fork truck is entering the DEM 512 field to service a trailer or if the fork truck is leaving the portal area after servicing the trailer and is moving toward the roadway 524. This is preferable for two reasons. First, if the fork truck is headed toward the roadway, its mode of operation should be changed quickly in order to provide the most useful signals to the operators of other fork trucks in the roadway and also so that the driver of fork truck 501 will be alerted in the most effective way. This situation will be discussed further in later paragraphs. The second reason is to be sure that the data being acquired is accurate. After a fork truck begins to enter deep into a long trailer, the PDSC will exit the DEM range and the data system will report that the fork truck has left the area after servicing the trailer. Then, when the fork truck backs out of the trailer and re-enters the DEM range, it will report a second visit to the portal area. To solve this problem, the DEM has two separate low frequency magnetic field generators that cooperate to make it possible to distinguish which direction a fork truck is exiting the DEM field. Once it is determined that the fork truck 501 has exited the portal area, the PDSC 505 will emit an ECHO at time 819, which the DEM 512 will be awaiting to receive. Once complete, both the PDSC 505 and the DAC DEM 512 know that the fork truck 501 has left and they re-set for the next cycle.

It should be noted that the data acquired from servicing a trailer is first stored in the PDSC 505, then automatically transmitted to the fork truck 501 via RS485, and then sent via a RF RELAY to the Cloud.

In order to know whether the PDSC on fork truck has left the field of the DEM because it is entering the trailer or because the truck is returning to the roadway, the DEM has two ferrites 204, 210 for generating magnetic pings. Ferrite 204 is oriented parallel to the floor. A second ferrite 210 is tilted at 45 degrees relative to the floor. As shown in FIG. 8, each ferrite 204, 210 is commanded in sequence. Since the DEM 512 is positioned above the PDSC 505, the strength of the tilted ferrite will vary in strength relative to the level ferrite, indicating which direction that the PDSC is moving. Having this information allows making a quick decision upon leaving the field headed toward the roadway to exit the portal mode and return the PDSC 505 to the standard operating mode before entering the roadway. Also, if the PDSC 505 exits the DEM 512 field due to the truck driving into the trailer, the data can be tagged so that it will correctly report that the truck only entered the portal area one time. It would be possible to report both events if desired.

Power levels from the RF transceiver 215 in DEM 201 should be only as high as needed for reliable communication within the portal zone, as good design practice. RF radiation reduces according to the square of the distance and it will reflect off of metallic surfaces. The result of the characteristics of RF is that in order to achieve a highly reliable transmission, the RF power level must be high enough to reach from the source to the receiver, with a substantial margin. In comparison, low frequency magnetic fields can be controlled with considerable precision due to the rapid rate at which the field strength reduces (according to the cube of the distance) and since the magnetic field will not be reflected from metallic objects or surfaces.

Figure 1:
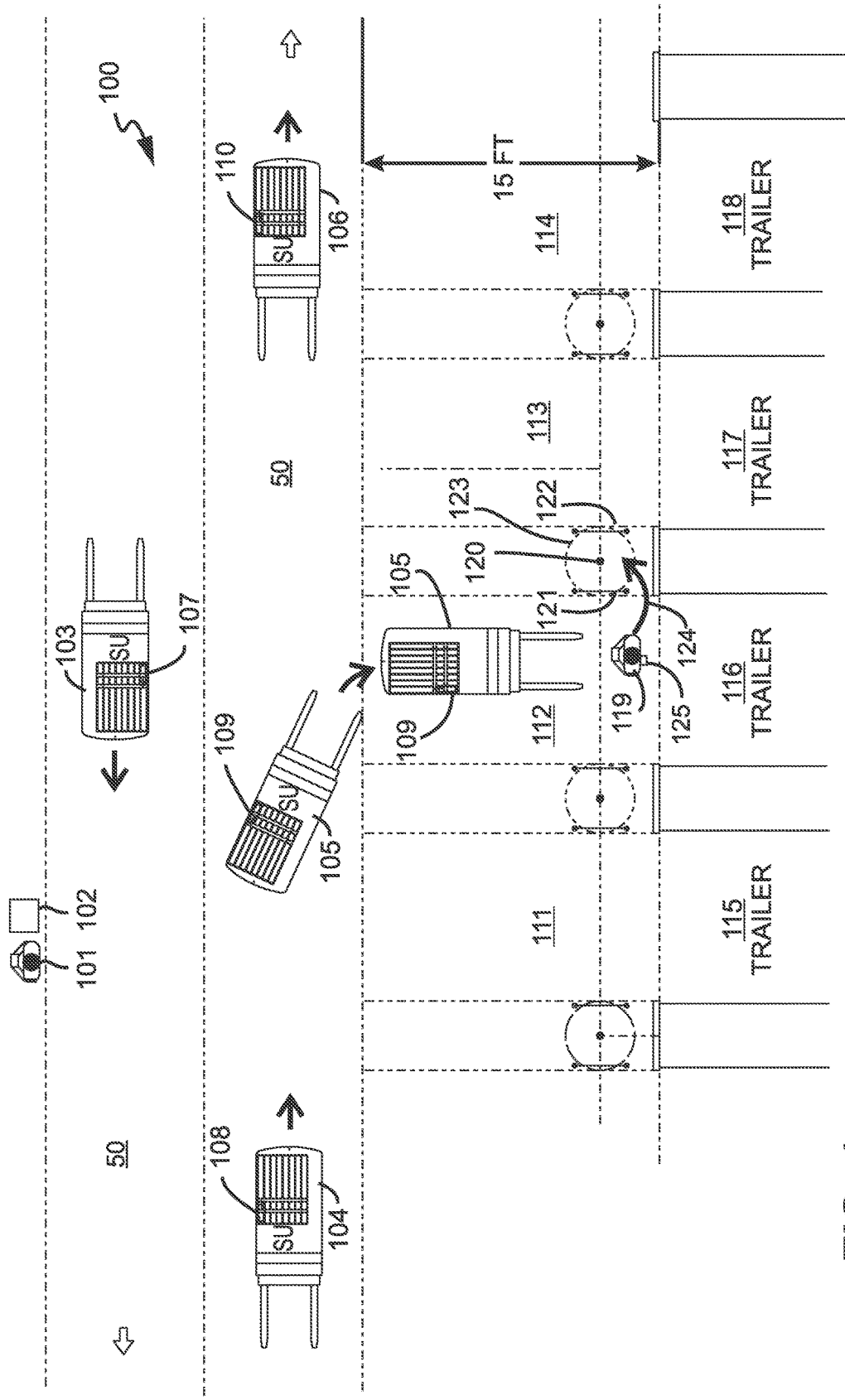
FIG. 1 is a schematic top view of one embodiment of a general layout of a loading dock, showing how fork trucks may maneuver.

After servicing a trailer, a fork truck will back out of the portal area, motor first, with forks trailing. The PDSC should be located near the canopy of the fork truck and as near the center of the fork truck as practical. All fork trucks in the facility need to have their PDSCs to be mounted on the same side of the fork truck, as explained earlier. As a fork truck backs out of a portal area into a roadway, there is a potential for a collision with fork trucks already traveling on the roadway. In FIG. 1, fork truck 112 depicts a fork truck that could either be entering or exiting the roadway 50. If exiting, fork truck 111 needs to be warned. However, a PDSC on truck 112 would not know if truck 112 was parked at the entrance of the portal area 104, preparing to enter portal 104 to service trailer 108 or was making ready to exit onto the roadway 50.

When fork truck 112 is inside the edge of the portal area, it will generally be oriented perpendicular to the roadway 50. If it is not moving or is moving very slowly so that its direction of travel is not certain, the operators of both fork trucks 111,112 should be given a special warning about this uncertain situation. Most roadways at large loading docks will be oriented in one general direction and that knowledge can be programmed into the PDSC 120. The compass inside the PDSC 120 can determine if the fork truck 112 is generally perpendicular to the roadway so that the driver of that fork truck can be given a special warning that there is another fork truck nearby on the roadway, assuming they are moving toward each other. The PINGs from the PDSC 120 can determine if the two fork trucks 111,112 are moving toward or away from each other by the changes in the strength of the PINGs. If they are moving apart, no warning is needed. Techniques, using the existing capabilities of the PDSCs on the two fork trucks can be used for alerting the fork truck 111 on the roadway, assuming an alert is needed.

FIG. 6 shows a fork truck 602 that has entered portal area 614 and has almost reached the magnetic field 615 that is produced by DEM 604. As the truck 602 continues into the DEM 604 magnetic field, the communications between the DEM 604 and PDSC 610 will proceed as described in the timing chart, FIG. 8. Once the PDSC 610 has confirmed that the start and stop times for the RF pulses and the low frequency PINGs are at the correct times, it sends a 916 MHz ECHO. When the DEM 604 receives the ECHO 810, 811 into its receiving window 816, 817, it confirms that the link up is complete and valid. Knowing that the timing is valid, data transmission from DEM 604 to PDSC 610 begins at time 812 and ends at time 813. There are options on how to establish the duration of this data transmission. For the configuration and timing contemplated for the arrangement disclosed in this current disclosure, the duration would typically be about 7 milliseconds to allow transmission of the I.D of the responding device and the I.D. of the PDSC, and the time stamp for the time of this proximity event. However, if there are PADs 125 within the range, transmitting their IDs will require additional time so that a 14 millisecond transmission would be used for that specific transmission. The PDSC 610 will send an ECHO that confirms receipt of the transmission. PDSC 610 immediately sends the data to the fork truck 602 via RS485 or CANbus. Once within range of a RELAY 217, the PDSC 610 will send the data to the Cloud via the RELAY. A crucial piece of data to be sent is the I.D. of the DEM 604 and the time that the linkup was made.

Pulsed low frequency magnetic fields produced by the DEM in the DAC assembly define a precise field that can be used to report to the cloud the specific fork truck I.D. If management agrees to allow the name of personnel to be correlated to the PDSC that they are operating or the PAD they are carrying, this information can be included in reports produced in the Cloud. Additions of precisely coordinated UHF communications can not only transmit this information, and possibly other information such as information about the trailer being serviced, but when used in precisely time cooperation with the low frequency pulses, can provide an extremely high reliability data system. Visible and/or audible warnings can be given if the fork truck is not intended to enter a trailer because, for example, its mast might be too tall. Such warnings may require a modification to the DEM for that purpose, but the functional capability exists within the DAC architecture.

In various embodiments, the DAC system 500 may be used to measure the speed of a vehicle, and if it is moving too rapidly, to give an alarm and/or give instructions to the vehicle to reduce speed. For example, the DEM microprocessor 206 may generate successive PINGs from the generators 202 and 208. If a vehicle is close enough to be in range of the PINGs, its PDSC will respond with ECHOs. The microprocessor 206 may initiate an exchange of two more PING/ECHO sequences to confirm that the signals are valid. Once that has been confirmed, the microprocessor 206 may send a data set through the UHF transceiver 219 to notify the PDSC that its speed is to be measured. The PDSC will begin to sense the pulses and measure their strength. The period of time between pulses can be pre-set or it can be transmitted to the PDSC via the data set. For purposes of this illustration, assume that a total of five pulses are sent, spaced 50 milliseconds apart. The amplitude of the oscillating magnetic field being sensed by the PDSC will increase inversely proportional to cube of the distance. The distance at which the PDSC will sense the magnetic field is preprogrammed and known (such as the distance for a warning zone, or a danger zone), the distance is known at which the speed calculations will begin. The microprocessor will then calculate the speed at which the vehicle is moving between each pulse. The readings will be averaged and compared to the value set into the DEM for this location. A suitable speed limit might be five (5) feet per second. Assuming that the magnetic field is adjusted to produce a magnetic that is approximately twenty (20) feet in diameter for the predetermined distance, then during the 200 milliseconds from the first pulse to the fifth pulse, the truck would move one foot. During that time the strength of the magnetic field would increase approximately by the cube of ten divided by nine (10/9), or thirty seven percent (37%). This should allow a sufficiently accurate speed measurement for most situations. If more accuracy is desired, the measurements can be fitted to a curve, more pulses can be sent, and/or the size of the magnetic field can be increased. The PDSC would be programmed to recognize if the speed exceeds five (5) feet per second. If so, it would flash the PDSC warning lights on the vehicle to alert the operator that the vehicle is moving too fast for this location, or automatically reduce the vehicle speed. Other embodiments may measure speed in locations other than the portal, such as in the roadway.

Again, the added function features described above take advantage of the elements and system capabilities of a typical pulsed low frequency magnetic field proximity detection system. For example, a DEM at emergency doors can record and transmit information about pedestrians that have passed through those doors, including direction of travel. Similarly, movements of pedestrians and fork trucks through doors or passage ways to areas that are restricted in some way can be tracked or can be inhibited by alarms or gates. DEMs located at the start of a sharp curve in a roadway can force a fork truck to a slower speed. Fork truck types that are too tall for a passageway can be stopped before collision. DEMs located at major pick up points and major dump points can be used to measure and report minimum, maximum, or average travel time for one or all vehicles. Objects near roadways can be tagged to give special warnings to vehicles. A device with this kind of capability that can be coupled with a powerful and precise proximity detection system can be used in a great variety of ways, simply by making adjustment of the software that are appropriate for the specific need. A crucial consideration is that DEMs can be added to a facility to improve safety and improve operations without adding other infrastructure since they work in cooperation with PDSCs that will typically have already been integrated into vehicles such as fork lifts.

Figure 10:
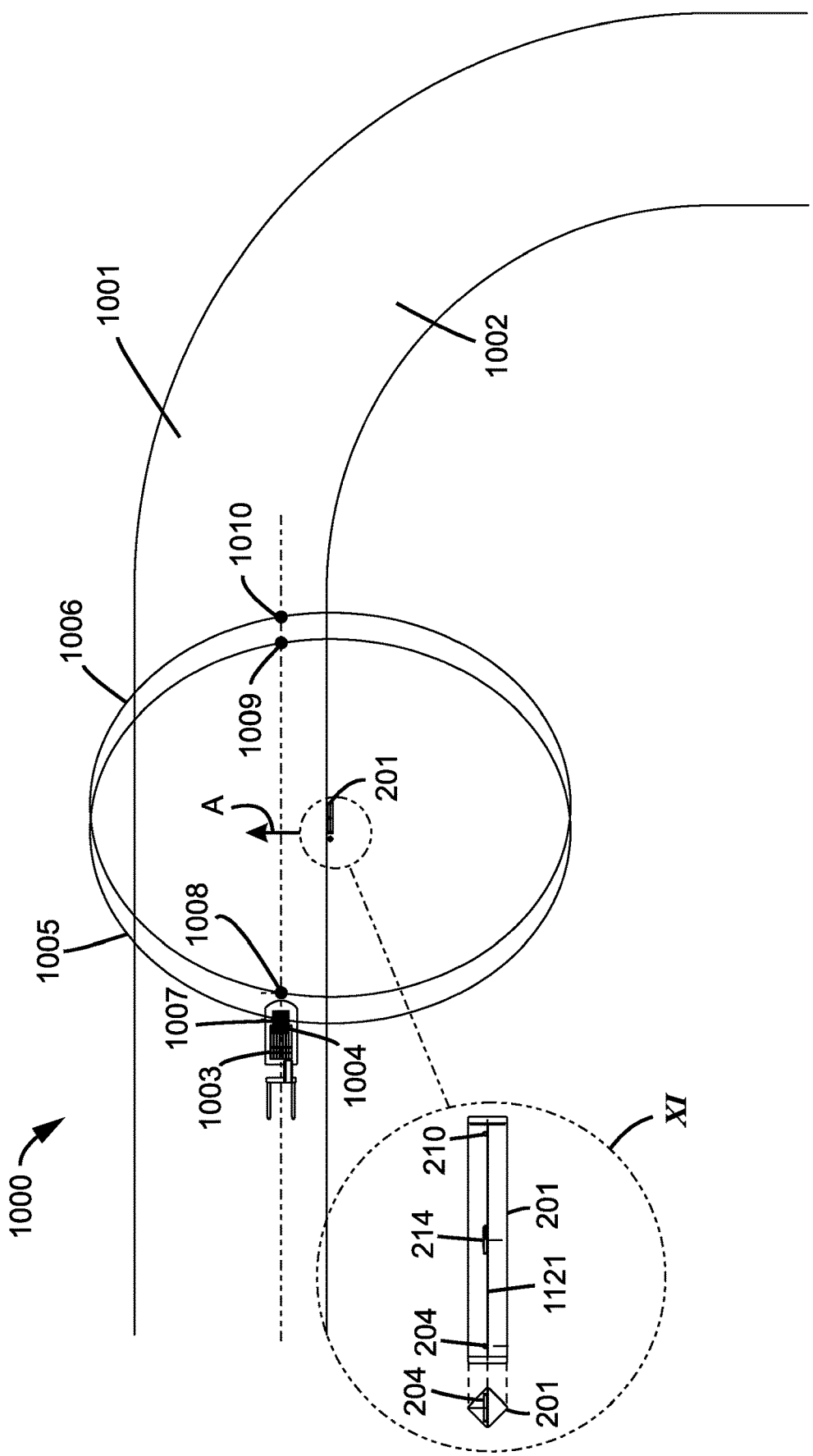
FIG. 10 is a schematic view of a roadway showing a DEM adjacent to the roadway near a curve.
Figure 11:
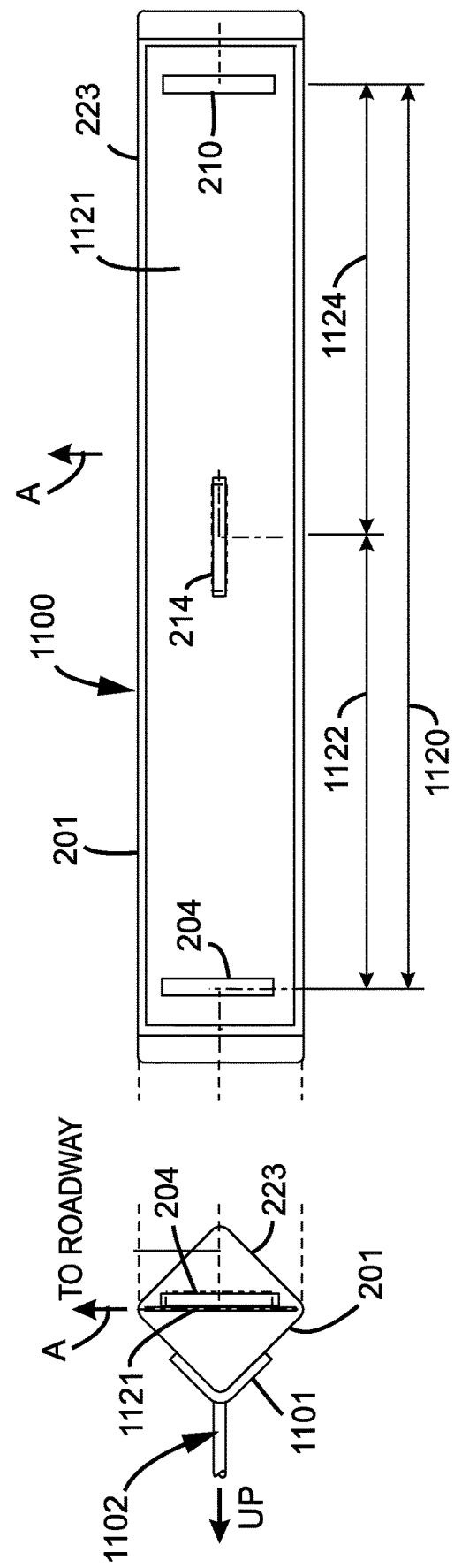
FIG. 11 is a detail schematic view of the DEM of FIG. 10 taken generally along the line XI in FIG. 10, showing the arrangement of the ferrites that produce the DEM fields and detection points.

Turning now to FIGS. 10-11A, DEMs 201 can be applied to improve material handling operations in numerous ways other than for loading docks by making software changes and/or minor hardware adjustments. For example, the circuit board 1121 (the components of which are substantially described with respect to PCBA 221 (FIG. 2)) can be oriented in order to produce separated pulsed magnetic fields that are directed horizontally across the roadway. This may be simply accomplished in the illustrated embodiment by sliding the circuit board into a square housing 223 in a horizontal orientation as shown in FIG. 11A, rather in a vertical orientation as described above with respect to the portal area. And by orienting the DEM ferrites 204, 210, described earlier, on the circuit board 1121 such that they are directed across the roadway, the direction and speed of vehicles traveling along the roadway can be measured. Of course, the very presence of the vehicles can be important for traffic control analysis and other reasons. This information can be used to alert the operator of the vehicle to potential dangers and/or threats to pedestrians and/or can take immediate actions to slow or stop the vehicles. Information acquired from interactions between DEMs and PDSCs and PADs can be automatically transmitted to the cloud where dashboards can be used to monitor and evaluate the movements of individual vehicles, groups of vehicles, and PADs for a variety of reasons.

FIG. 10 depicts a materials handling environment 1000 which includes a roadway 1001 and a fork truck 1003 that is moving material along the roadway 1001 toward a curve 1002. A DEM 201 has been positioned along the roadway 1001, at approximately the same elevation as the PDSC 1004 on the fork truck 1003. The DEM 201 is positioned with the ferrites 204, 210 directed in direction A across the roadway 1001. These ferrites 204, 210 produce the pulsed magnetic fields 1005, 1006.

As the fork truck 1003 approaches the magnetic fields 1005, 1006, the sensing ferrite 214 detects the semi-random PINGS from the PDSC 1004. Receipt of these PINGs by the ferrite 214 results in activating the microprocessor 206 to take the actions required to accurately acquire signals. Similar to the explanation given for the DAC system described earlier, the UHF receiver 219, by control of the microprocessor 206, checks to determine if there is another transmitter in the area already using the selected frequency, such as 916 MHz. If that frequency is in use, the UHF transceiver will switch to an alternate frequency, such as 918 MHz, and begin transmitting a carrier signal that alerts any other DEMS or PDSCs in the area that this device is going to use this frequency for the next few milliseconds. If the first frequency is clear, the UHF transceiver 219 will use that frequency, 916 MHz in this example.

In the illustrated example, after starting UHF transmissions, the microprocessor 206 will immediately begin issuing pulsed magnetic fields 1005, 1006 from the ferrites 204, 210 at approximately 100 pulse-pairs per second. When the PDSC 1004 on fork truck 1003 reaches the first field 1005, produced by ferrite 204, which is shown as point 1007, it will initiate the measuring process, until it reaches the field 1006 at point 1008. After the fork truck 1003 exits the fields 1005, 1006, the pulsing would end and the system would be ready for arrival of the next truck. In the event a fork truck might stop while in the fields, the pulsing would be ended after five seconds to avoid overheating of the ferrites.

Fundamental to being able to measure the speed and direction of travel of the fork truck 1003 is the physical arrangement and spacing of the ferrites 204, 210 and the timing of the pulsed magnetic fields 1005,1006. FIG. 11 shows a typical DEM assembly 1100, which is constructed in the same way as DEM 201, that includes a PCBA 221 in a housing 223, and supporting elements 1101,1002. The PCBA 221 may actually be two or three separate PCBAs that are wired together, depending upon the length of the housing 223. The housing 223 would typically be supported by an angle 1101, which, in turn, would be held in position by a support rod 1102. This rod 1102 would be attached to any available structure above the DEM 1100. With the rod 1102 being vertical, the PCBA 221 would be horizontal. With the ferrites 204, 210, mounted as shown, the fields 1005, 1006 are directed horizontally, across the roadway 1001.

Spacing 1120 between the ferrites 204, 210 and the pulse rate can be changed to satisfy performance requirements for the application being addressed. Spacing 1120 of the ferrites 204, 210 to each other in DEM 1000 shown in FIG. 10 has been selected to be 36 inches. DEM 1000 is constructed in the same way as DEM 201. Spacing 1122 and 1124 of the ferrites 204, 210 to ferrite 214 in DEM 1000 shown in FIG. 10 has been selected to be 18 inches, with ferrite 214 positioned midway between the ferrites 204, 210. The field 1005, 1006 pulse rate is chosen to be 100 pulse-pairs per second. This arrangement provides a speed resolution of approximately plus or minus five percent (+/−5%). If the need is to only determine if the fork truck 1003 is moving "slow" or "fast", the separation can be reduced or the pulse rate can be reduced, or both. FIG. 10 shows that there are two other useful points 1009, 1010 that can be used to measure speed a second time, if desired. It is also possible to further improve accuracy by using the strength of the magnetic fields 1005, 1006 between the detection points 1004, 1005, 1009, 1010, such as explained above.

Fork trucks are known to overturn, on occasion, when making sharp turns, often as a result of excessive speed and/or of the load on the forks shifting. Also, payloads sometimes slide off the forks, striking pedestrians or striking other objects that the crush someone behind the object. Training, signs, and various safety techniques are sometimes used to encourage operators to properly reduce speed before making turns. By placing a DEM 201 prior to the entrance of a curve, as shown in FIG. 10, the speed of the fork truck 1003 can be determined and the PDSC system 1104 on the fork truck 1003 can either produce visual and audible warnings or send signals to the fork truck to command a slower speed. Managers, safety engineers or traffic planners can use a dashboard to monitor the speeds of the fork truck 1003 each time it enters and exits the curve, be alerted to speeds exceeding speed limit signs and/or training, and compare the operating habits of all operators for all fork trucks entering the curve 1002.

Figure 12:
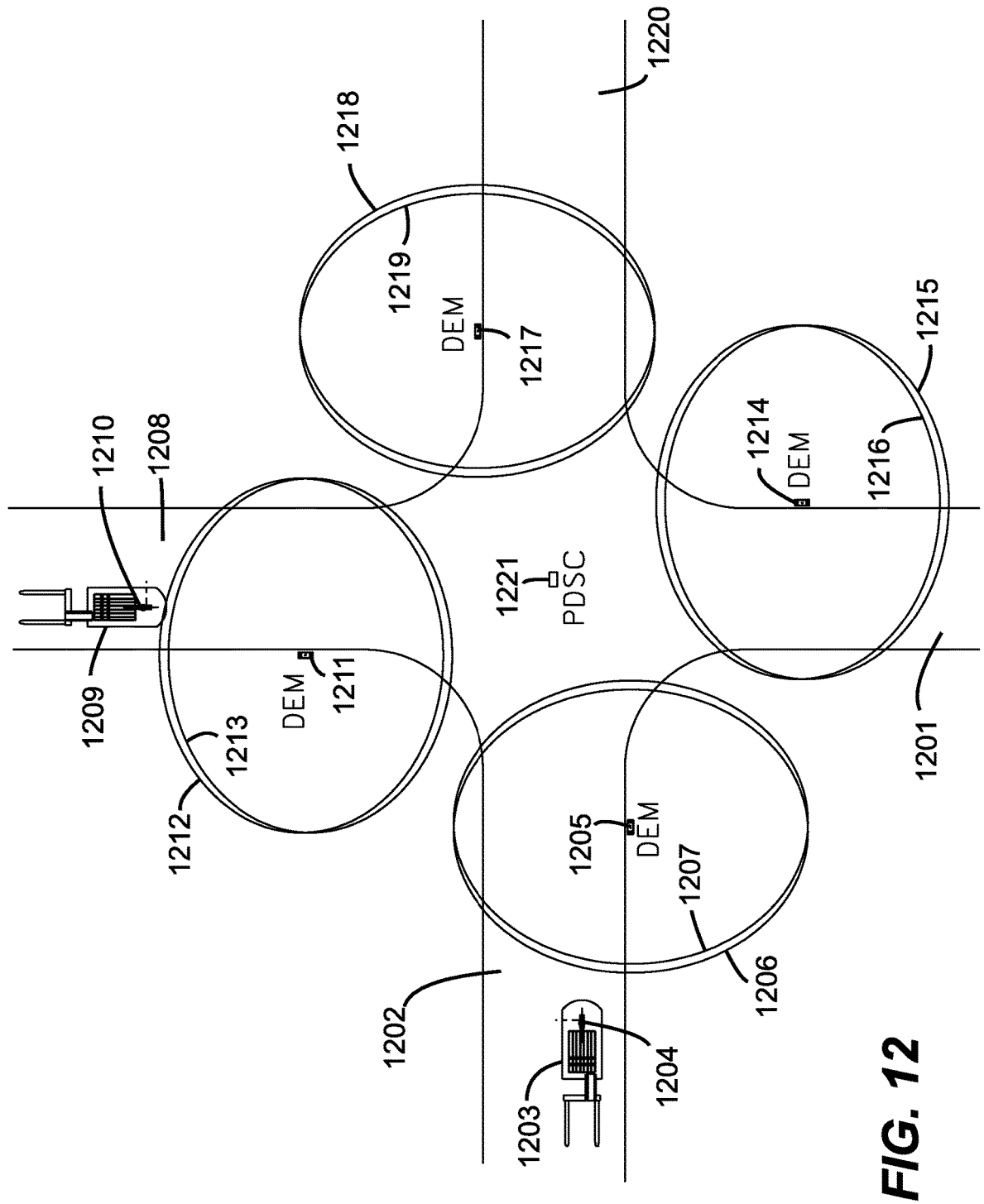
FIG. 12 is a schematic view of one embodiment of a four way intersection having DEM/PDSC Control in accordance with the principles of this disclosure.

A Proximity Detection System that is precise, can easily communicate proximity events to the cloud, and perform many specialized functions by simply adding one or more low cost DEMs, illustrates the value of having such devices within material handling facilities. Another indication of the operational value of being able to add DEMs to a facility that has been outfitted with an effective use of pulsed magnetic fields is the challenging control of traffic at intersections and of being able to report such activities. The functionality possibilities of using DEMs can be indicated by considering a four-way intersection such as depicted in FIG. 12. The details of the DEM functionality are the same as described in previous paragraphs. The DEMs reveal presence of vehicles, and measure and report their speed, and direction of travel. They can also detect the presence of PADs. However, for complex circumstances such as intersections, there must be a higher-level logic and there can be many versions. For example, there can be a rule that the first vehicle or pedestrian to arrive at a specific point, are given priority for entering the intersection. Alternatively, some directions may be given priority over others. To accomplish such a logic, there must be an administrator or controller. In the instance depicted in FIG. 12, PDSC controller 1221 is suspended above the center of the intersection 1200 performs that function. It may make decisions to produce signals to operators or may inhibit the movement of a vehicle into the intersection until the set priorities have been satisfied. The truck 1203 located in roadway 1202, having a PDSC 1204 would be under the control of the PDSC 1221 in some preferred fashion. Likewise, truck 1209 in roadway 1208, having a PDSC 1210 would also be subject to the control of the same PDSC 1221. The primary information feeding into the PDSC 1221 would be derived from the DEMs 1205 and 1211 which produce the fields 1206, 1207, 1212, 1213. Any other trucks entering from roadway 1201 or 1220 would be controlled by the logical management of the signals from the fields 1215, 1216, 1218, 1219 which would be generated by DEMs 1214, and 1217, along with the inputs from all the above. DEMs 1205, 1211, 1214, 1217 are constructed in the same way as DEM 201. Although the management of all this information, according to the established logic for the facility involved, is not a sophisticated process, the possibilities are almost limitless. But, to produce a precise and safe intersection control, and to be able to report all events at the intersection to a dashboard is a significant achievement. When this can be accomplished by adding a relatively small amount of equipment (four DEMs and one PDSC controller) to be used in conjunction with an existing Proximity Detection System, the benefits-to-cost is significant.

If there is a need to investigate the traffic experiences at a particular location where there have been speeding complaints or accidents or near misses, a DEM can be equipped with a battery to allow it to be moved between locations without notice. There are many types of locations where speed monitoring and/or speed control is needed, along with accurate reporting. By installing a few DEMs at strategic locations in a facility, many types of traffic studies and operational practices can be performed. Whether fixed or moveable, the DEMs report the presence of passage, speed, direction to the cloud, allowing numerous types of evaluations to be made. The transient time of any or all vehicles between any selected points can be known and can be processed in various ways by use of the dashboard to evaluate various aspects of the facility traffic control and operator habits and practices.

The embodiments of the disclosure and the various features and advantageous details thereof are explained more fully with reference to the non-limiting embodiments and examples that are described and/or illustrated in the accompanying drawings and detailed in the description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure.

What is claimed is:

1. A dock area control system, comprising:
   at least one vehicle having a vehicle proximity detection system (PDSC), the PDSC including:
      a vehicle low frequency magnetic field generator (MFG) configured to generate a vehicle pulsed magnetic field defining a vehicle marker field, wherein boundaries of the vehicle marker field are at an equal vehicle threshold strength of the vehicle pulsed magnetic field, and wherein a duration of pulses of the vehicle pulsed magnetic field are selectable between a standard duration in a standard mode and a portal duration in a portal mode, the standard duration being different from the portal duration; and
      a vehicle low frequency magnetic field detector associated with the at least one vehicle that can detect pulsed magnetic marker fields and a duration of pulses of the pulsed magnetic marker fields; and
   at least one dock area controller (DAC), the DAC including:
      at least one dock electronic module (DEM), the DEM including a DEM low frequency magnetic field generator (DEM MFG) that generates a pulsed DEM magnetic field defining a DEM marker field, wherein boundaries of the DEM marker field are at an equal DEM threshold strength of pulses of the pulsed DEM magnetic field.

2. The dock area control system of claim 1, wherein: if one of the at least one vehicle is trailing another of the at least one vehicle, the PDSC is configured to provide an alert to encourage operators of the one of the at least one vehicle and the another of the at least one vehicle to adjust speeds of the one of the at least one vehicle and the another of the at least one vehicle so that the one of the at least one vehicle and the another of the at least one vehicle are at least 30 feet apart.

3. The dock area control system of claim 1, wherein:
   vehicles in the portal mode are adapted to communicate with the DAC to:
      acquire an identification (I.D.) of the DAC and other information, wherein the I.D. and the other information are time stamped,
      wherein the I.D. and the other information are transmitted to fork vehicle systems via RS-485 or CAN bus, data corresponding to the I.D. and the other information being stored in a data module and then automatically downloaded to a RELAY for transmittal to a Cloud, to produce reports as requested.

4. The dock area control system of claim 1, further including a personal alarm (PAD) worn by a pedestrian, the PAD including:
   a PAD low frequency magnetic field detector associated with the PAD and adapted to detect the pulsed magnetic marker fields, and to detect a duration of the pulses of the pulsed magnetic marker fields;
   a PAD RF signal generator associated with the PAD and adapted to generate RF signals; and
   a PAD RF signal detector associated with the PAD and adapted to detect other RF signals.

5. The dock area control system of claim 4, wherein the DAC is configured to provide silent spots to generate silent spot fields, adjacent to portal areas, within or generally coextensive with provided physical barrier safe zones, wherein the PAD is configured not to respond to the vehicle pulsed magnetic field detected in one of the silent spots.

6. The dock area control system of claim 4, wherein elements of the PDSC, DAC, and PAD are timed for cooperative functioning.

7. The dock area control system of claim 1, wherein the DAC is configured to:
   determine directions of travel of vehicles within a range of the DAC;
   transmit data related to a location that the DAC is identifying; and
   acquire data related to pedestrians and the vehicles within the range.

8. The dock area control system of claim 1, wherein elements of the dock area control system each operate asynchronously and are configured to minimize conflicts by use of fixed timing sets and concurrent transmissions.

9. The dock area control system of claim 1, wherein: when the duration of the pulses of the vehicle pulsed magnetic field are in the portal mode, the DEM is configured to issue two millisecond PINGs, divided into two parts, one of the two parts being issued from a reference ferrite that is parallel to a floor of a dock area and another of the two parts being issued from an in/out ferrite being at approximately 45 degrees relative to the floor.

10. The dock area control system of claim 1, wherein when the duration of the pulses of the vehicle pulsed magnetic field are in the portal mode, the PDSC is adapted to: (1) give a command to the at least one vehicle to reduce its speed to a specified maximum speed, (2) reduce power to the MFG in order to reduce a range of the PDSC, (3) change PINGs to 2.3 millisecond duration (4) stop detection of 3 millisecond PINGs from other vehicles; and (5) begin listening for UHF RF pulses and associated low frequency PINGs that are produced by the at least one DEM.

11. The dock area control system of claim 1, wherein: the dock area control system is configured to determine whether a vehicle of the at least one vehicle is traveling toward a trailer or traveling toward a roadway.

12. The dock area control system of claim 1, wherein: the DEM has two separate low frequency magnetic field generators that cooperate to determine a direction a vehicle of the at least one vehicle is exiting the DEM marker field.

13. The dock area control system of claim 1, wherein the at least one vehicle is a robotic vehicle.

14. A dock area control system, comprising:
  a vehicle having a vehicle proximity detection system (PDSC), the PDSC including:
    a vehicle low frequency magnetic field generator (MFG) configured to generate a vehicle pulsed magnetic field defining a vehicle marker field, wherein boundaries of the vehicle marker field are at an equal vehicle threshold strength of the vehicle pulsed magnetic field, and wherein a duration of pulses of the vehicle pulsed magnetic field are selectable between a standard duration in a standard mode of the PDSC and a portal duration in a portal mode of the PDSC, the standard duration being different from the portal duration;
    a vehicle low frequency magnetic field detector associated with the vehicle that detects pulsed magnetic marker fields and a duration of pulses of the pulsed magnetic marker fields;
    a vehicle radio frequency (RF) signal generator associated with the vehicle and configured to generate RF signals; and
    a vehicle RF signal detector associated with the vehicle and configured to detect other RF signals;
  a personal alarm (PAD) worn by a pedestrian, the PAD including:
    a PAD low frequency magnetic field detector associated with the PAD and configured to detect the pulsed magnetic marker fields and the duration of the pulses of the pulsed magnetic marker fields;
    a PAD RF signal generator associated with the PAD and configured to generate PAD RF signals, and
    a PAD RF signal detector associated with the PAD and configured to detect RF signals other than the PAD RF signals;
  a dock area controller (DAC), the DAC including:
    a dock electronic module (DEM), the DEM including:
      a DEM processor having a microprocessor,
      a DEM low frequency MFG (DEM MFG) configured to generate a pulsed DEM magnetic field defining a DEM marker field, wherein boundaries of the DEM marker field are at an equal DEM threshold strength of magnetic field pulses of the DEM magnetic field, the DEM MFG having:
        a reference MFG component configured to generate a reference pulsed magnetic field oriented in a reference direction, and
        an in/out MFG component configured to generate an in/out pulsed magnetic field oriented in an in/out direction, wherein the in/out direction is at a DEM MFG component angle to the reference direction,
        wherein the in/out MFG component is positioned a MFG component distance from the reference MFG component;
        wherein the reference MFG component is configured to generate the reference pulsed magnetic field having a reference pulsed magnetic field duration, the reference pulsed magnetic field duration extending from a reference pulsed magnetic field start time to a reference pulsed magnetic field end time;
        wherein the in/out MFG component is configured to generate the in/out pulsed magnetic field having an in/out pulsed magnetic field duration, the in/out pulsed magnetic field duration extending from an in/out pulsed magnetic field start time to an in/out pulsed magnetic field end time; and
        wherein the DEM MFG is electrically connected to the DEM processor and a tuned circuit;
      a DEM magnetic field detector associated with the DEM and configured to detect the pulsed magnetic marker fields and the duration of the pulses of the pulsed magnetic marker fields; and
      a DEM RF signal transceiver including a DEM RF signal detector associated with the DEM and a DEM RF signal generator associated with the vehicle,
  wherein the PDSC is configured to generate, when the PDSC is in the standard mode, a low frequency magnetic field standard PING for the standard duration, to then listen for a DEM ECHO for a DEM ECHO duration of 1.25 milliseconds, to then listen for a PAD ECHO for a PAD ECHO duration of 1.5 milliseconds, and to then listen for a PDSC ECHO from other PDSCs for a PDSC ECHO duration of 1.5 milliseconds, and to switch to the portal mode upon receiving the DEM ECHO;
  wherein the PDSC is configured to listen, in the portal mode of the PDSC, for an RF signal, to generate a low frequency magnetic field portal PING for the portal duration and concurrently generate a RF frequency data signal for the portal duration, to then listen for a DEM low frequency magnetic field PING for a DEM PING duration of 1.25 milliseconds, to then listen for a PAD ECHO for a PAD ECHO duration of 1.5 milliseconds, to determine a ratio of a field strength of the DEM PING during a reference half of the DEM PING duration divided by a field strength of the DEM PING during an in/out half of the DEM PING duration, to determine based on the ratio a direction or speed of the vehicle, to generate another RF signal indicative of the direction or speed of the vehicle, and to switch to the standard mode upon either no longer receiving a DEM ECHO or receiving instructions to switch by one or more RF switch signals;
  wherein the DEM is configured to listen, when the PDSC is in the standard mode, for one or more RF signals, to generate a low frequency magnetic field standard PING for the portal duration and concurrently generate a RF frequency data signal for the portal duration; and
  wherein the DEM is configured to listen, when the PDSC is in the portal mode, for one or more other RF signals, to listen for a PDSC low frequency magnetic field PING ECHO for the portal duration, and to generate another RF frequency data signal including instructions to the PDSC to switch to the standard mode.

15. The dock area control system of claim 14, wherein: if the vehicle has just exited from a portal area within the past five seconds, and the vehicle receives an ECHO that indicates a second vehicle is approaching, the PDSC on the vehicle is configured to determine from analysis of magnetic field vectors or from compass readings if the vehicle is approximately perpendicular to the second vehicle; and
wherein the vehicle is configured to stop or remain stopped until the second vehicle has begun moving away or is out of range.

16. The dock area control system of claim 14, wherein the DEM and the PDSC are configured to determine that a specific vehicle DAC pair are communicating only with each other.

17. The dock area control system of claim 14, wherein: a time slot is established during which the DEM can transmit an identification (I.D.) of the DEM and other data; and wherein if other PADs are in a range of the DEM during the time slot, I.D.s of the other PADs are sent in a second 7 millisecond data pack.

18. The dock area control system of claim 14, wherein: the dock area control system is configured such that two separate PINGs allow determination by the dock area control system of whether the vehicle is entering the DEM field to service a trailer or if the vehicle is leaving the portal area after servicing the trailer and is moving toward a roadway.

19. The dock area control system of 14, wherein: a compass inside the PDSC is configured to determine if the vehicle is generally perpendicular to a roadway such that a driver of the vehicle is given a warning that there is another vehicle nearby on the roadway.

20. The dock area control system of claim 14, wherein the standard duration is 3 milliseconds and the portal duration is 2.3 milliseconds.

21. The dock area control system of claim 14, wherein the reference direction is horizontal.

22. The dock area control system of claim 14, wherein the DEM MFG component angle is below a horizontal plane that includes the reference direction.

23. The dock area control system of claim 14, wherein the DEM MFG component angle is in a vertical plane that includes the reference direction.

24. The dock area control system of claim 14, wherein the DEM MFG component angle is from thirty (30) degrees to sixty (60) degrees.

25. The dock area control system of claim 14, wherein the DEM MFG component angle is forty-five (45) degrees.

26. The dock area control system of claim 14, wherein the MFG component distance is in the reference direction.

27. The dock area control system of claim 14, wherein the MFG component distance is from eight inches to twelve inches.

28. The dock area control system of claim 14, wherein the in/out pulsed magnetic field duration occurs after the reference pulsed magnetic field duration.

29. The dock area control system of claim 14, wherein the in/out pulsed magnetic field start time occurs after the reference pulsed magnetic field end time.

30. The dock area control system of claim 14, wherein the in/out pulsed magnetic field start time occurs at the same time as the reference pulsed magnetic field end time.

31. The dock area control system of claim 14, wherein the reference pulsed magnetic field duration is one thousand (1000) microseconds.

32. The dock area control system of claim 14, wherein the in/out pulsed MFG duration is one thousand (1000) microseconds.

33. The dock area control system of claim 14, wherein the tuned circuit includes an inductor and a capacitor.

34. The dock area control system of claim 14, further comprising a safe spot low frequency MFG configured to generate a pulsed safe spot magnetic field defining a safe zone field, wherein boundaries of the safe zone field are at an equal threshold strength of pulses of the pulsed safe spot magnetic field.

* * * * *